United States Patent
Kimura et al.

(10) Patent No.: US 7,701,986 B2
(45) Date of Patent: Apr. 20, 2010

(54) LASER LIGHT SOURCE APPARATUS AND IMAGE GENERATING APPARATUS USING SUCH LASER LIGHT SOURCE APPARATUS

(75) Inventors: Kaoru Kimura, Tokyo (JP); Michio Oka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/002,623

(22) Filed: Dec. 18, 2007

(65) Prior Publication Data

US 2008/0259986 A1 Oct. 23, 2008

(30) Foreign Application Priority Data

Dec. 19, 2006 (JP) .......................... P2006-341548

(51) Int. Cl.
  *H01S 3/10* (2006.01)
  *H01S 3/08* (2006.01)
(52) U.S. Cl. .............................. 372/21; 372/22; 372/99
(58) Field of Classification Search .................. 372/21, 372/22, 99
See application file for complete search history.

(56) References Cited

U.S. PATENT DOCUMENTS

2003/0035448 A1   2/2003   Yin

2005/0238071 A1 *  10/2005   Oka ........................... 372/21

FOREIGN PATENT DOCUMENTS

| JP | 02-256012 | 10/1990 |
|---|---|---|
| JP | 08-064897 | 3/1996 |
| JP | 2000-208842 | 7/2000 |
| JP | 2004-163902 | 6/2004 |
| JP | 2005-158902 | 6/2005 |
| JP | 2006-066818 | 3/2006 |
| JP | 2006-100772 | 4/2006 |
| JP | 2008-112846 | 5/2008 |

* cited by examiner

*Primary Examiner*—Armando Rodriguez
(74) *Attorney, Agent, or Firm*—Robert J. Depke; Rockey, Depke & Lyons, LLC

(57) ABSTRACT

Disclosed is a laser light source apparatus. The laser light source apparatus includes a pumping light source and a pair of resonator mirrors. In the laser light source apparatus, the pumping light source includes at least a laser medium and a wavelength conversion element, and the laser medium is pumped by light having a multi-transversal mode pattern and the wavelength conversion element are irradiated with a line beam of fundamental wave obtained by the oscillation by the laser medium to output a line beam of converted wave. The laser light source apparatus further includes at least one reflector bending light path is provided in the resonator such that a longitudinal direction of the line beam of fundamental wave is approximately perpendicular to an incident plane of the reflection unit.

8 Claims, 13 Drawing Sheets

LASER LIGHT SOURCE APPARATUS AND IMAGE GENERATING APPARATUS USING SUCH LASER LIGHT SOURCE APPARATUS

CROSS REFERENCES TO RELATED APPLICATIONS

The present invention contains subject matter related to Japanese Patent Application JP 2006-341548 filed in the Japanese Patent Office on Dec. 19, 2006, the entire contents of which being incorporated herein by reference.

BACKGROUND OF THE INVENTION

1. Field of the Invention

The present invention relates to a laser light source apparatus which outputs line beams of converted light such as one-dimensional multi-transversal mode beam obtained by wavelength conversion in intra-cavity, and to an image generating apparatus utilizing such laser light source apparatus.

2. Description of the Related Art

In various optical apparatus such as projectors and laser printers using laser light sources, it is preferable that the optical apparatus include a small laser light source that only consumes small power and generates a stable output. In a laser light source apparatus having a resonator structure with a wavelength conversion element such as a nonlinear optical crystal and having a function for converting a fundamental wave into some wave such as a higher harmonic wave, there is disclosed a laser light source apparatus including a reflector in a resonator so as to reduce the size of the laser light source apparatus while still securing a predetermined resonator length inside of the apparatus. Further, there is also disclosed an apparatus including a reflector capable of effectively having a curvature so as to achieve high conversion efficiency by reducing a mode diameter in a wavelength conversion element to increase power density of a fundamental wave.

Unexamined Published Japanese Patent Application No. 2006-66818 discloses a laser light source apparatus capable of outputting waves that are converted into a line beam (e.g., elliptic) form using one-dimensional multi-transversal mode pumping light generated from an array laser diode to eliminate non-uniform illumination due to interference when a solid-state laser utilizes a laser diode as a pumping light source.

SUMMARY OF THE INVENTION

However, when the laser light source apparatus is designed to have the arrangement disclosed in the Unexamined Published Japanese Patent Application No. 2006-66818, it is preferable to reduce the size of the laser light source apparatus by utilizing reflecting light inside the resonator; however, it may be difficult to sufficiently increase the number of spatial modes of obtained line beams, and hence uniformity and stability of the illumination may not be obtained.

FIGS. 1A and 1B are schematic plan views illustrating an example of a laser light source apparatus capable of outputting line beam of converted waves by reflecting a light path inside a resonator viewed from different directions. As shown in FIGS. 1A and 1B, the laser light source apparatus 80 includes a pumping light source 61, and a reflection unit 67 including collimator lenses 62 and 63, a condenser lens 64, a laser medium 66, and a plane mirror located in a light path of light emitted from the pumping light source 61. A reflection unit 68 including a concave mirror is located in a light path of light reflected by the reflection unit 67. Further, a wavelength conversion element 70 including a nonlinear optical crystal or nonlinear optical device and a resonator mirror 69 for reflecting a fundamental wave at high reflectance and which passes a converted wave at high transmittance are located in a light path of light reflected by the reflection unit 68. A resonator mirror 65 including a reflection thin-film coating with a wavelength selection function to pass pumping light at high transmittance and which reflects a fundamental wave at high reflectance is provided at a pumping light incident end of the laser medium 66. A resonator 75 is formed between the resonator mirrors 65 and 69. FIG. 1A shows a plan view of the laser light source apparatus as is seen from the direction perpendicular to the incident plane of a light path of light reflected by the reflection units 67 and 68 and FIG. 1B shows a plan view of the laser light source apparatus as is seen from the direction extending along the incident plane. Since the reflection light path is configured by providing the reflection units 67 and 68 within the resonator 75 as described above, the whole of the laser light source apparatus 80 can be reduced in size.

In the above-mentioned arrangement, multi-transversal mode laser light emitted from the pumping light source 1 such as the laser diode array is collimated as parallel light by the collimator lenses 62 and 63. In FIGS. 1A and 1B, the array direction of light-emitting devices in the pumping light source 61 such as the laser diode array is assumed to be a y-axis direction and a direction extending along the light path of light emitted from the pumping light source 61 is assumed to be an x-axis direction. A minor-axis direction of light set to the multi-transversal mode is assumed to be a z-axis direction. In this case, laser beam bundles on the x-z plane are collimated by the collimator lens 62 and laser beam bundles on the y-z plane are collimated by the collimator lens 63.

Light passed through these collimator lenses 62 and 63 is converged by the condenser lens 64 at the later stage and irradiated on one end of the laser medium 66 through the resonator mirror 65 as line beam of which y-axis direction is set to the longitudinal direction. Then, the line beam of fundamental wave pumped by the laser medium 66 is incident on the reflection unit 67 as a line beam of which y-axis direction is set to the longitudinal direction, reflected therein, further similarly reflected by the reflection unit 68, reflected and incident on the wavelength conversion element 70. A fundamental wave reached to the resonator mirror 69 through the wavelength conversion element 70 is reflected therein and reciprocated within the resonator 75. In FIGS. 1A and 1B, the longitudinal direction of the line beam of fundamental wave emitted from the laser medium 66 is shown by an arrow e1 and a longitudinal direction of emitted light Lo' converted at the wavelength conversion element 70, passed through the resonator mirror 69 and outputted to the outside is shown by an arrow e3.

In this case, since the light path of oscillated light in the resonator 75 including the resonator mirrors 65 and 69 and the reflection units 67 and 68 lies within the same plane as the longitudinal direction of the line beam of fundamental wave beam, the arrangement of the resonator 75 is not symmetrical to the longitudinal direction of the beam, that is, the light path of the oscillated light is not symmetrical to the longitudinal direction of the beam. When the light path of resonance light becomes asymmetrical to the longitudinal direction of the beam as described above, light becomes abaxial light relative to the spherical mirror in the longitudinal direction of the line beam. As a result, comatic aberration is obtained remarkably in the reflection unit 68 of which radius of curvature is limited when light is obliquely incident, and there is then a risk that wavefront aberration several times the wavelength will take place easily. For example, when parallel light with a beam radius of 10 mm becomes incident on a concave mirror with a radius of curvature of 100 mm at an incident angle of 10 degrees, a wavefront aberration amount reaches to more than 10 times of a wavelength of 1064 nm. Accordingly, an intensity distribution of a resonating fundamental wave beam becomes asymmetrical as shown in FIG. 2. In the wavelength conversion, a fundamental wave power density affects conversion efficiency greatly so that, when conversion efficiency in a single path, for example, is low, the conversion efficiency is proportional to a square of a fundamental wave power density. When non-uniformity occurs in the intensity distribution as shown in FIG. 2, the line beam of fundamental wave power density may be non-uniform and spatial non-uniformity is generated in the converted wave. As a result, when an image is generated by using this converted wave, the spatial non-uniformity may be a cause to prevent homogeneous image quality from being obtained and which causes utilization efficiency of light to be lowered. Further, there is a possibility that power transition becomes easy to take place between spatial modes due to disturbance such as vibrations. It is not preferable to stabilize beam shape.

For increasing efficiency in wavelength conversion within the resonator, it is desirable to increase a fundamental wave power density by reducing a mode size of laser oscillation in the wavelength conversion element as described above. To this end, it is desirable that a distance (distance between resonator mirrors 68 and 69) of the light path of the resonator including the wavelength conversion element be properly made shorter than a distance between resonator mirrors 65 and 68 through 66 and 67 of the light path of the resonator which does not include the wavelength conversion element. However, in this case, the longitudinal direction of the line beam of fundamental wave is extending along the incident plane so that the line beam is oscillated line beam of and widely. When asymmetry of such wide line beam of fundamental wave is reduced, the resonator arrangements other than the longitudinal direction of the beam are made similar to those of FIGS. 1A and 1B, a resonator length may be increased by suppressing the incident angles of the reflection units 67 and 68, thereby preventing laser from being high in efficiency and from being reduced in size in size. Further, from a standpoint of manufacturing laser modules, a non-uniform laser beam may inhibit a sufficiently large margin from being produced against fluctuations in the longitudinal direction of the beam.

Due to the above-mentioned reasons, when a laser light source apparatus has an arrangement to bend the light path of the resonator, it may be difficult to sufficiently increase the number of spatial modes of a line beam at present and it is also difficult to sufficiently improve uniformity and stability.

Similar cases arise not only in the above-mentioned image generating apparatus such as a projector and a printer but also in the case in which the laser light source apparatus for generating one-dimensional converted waves is applied to exposure and annealing in other semiconductor process apparatus. Therefore, it is requested that uniformity and stability of output light may be improved.

In the laser light source apparatus including the resonator having the light path of the light reflecting the above-mentioned line beam of fundamental wave and the image generating apparatus using such laser light source apparatus, an embodiment of the invention intends to provide uniform and stabilized output light.

A laser light source apparatus according to an embodiment of the invention may include a pumping light source and a pair of resonator mirrors forming the resonator which includes the pumping light source that includes at least a laser medium and a wavelength conversion element. In the resonator, the laser medium is pumped by light having a multi-transversal mode pattern and the wavelength conversion element is irradiated with a line beam of fundamental wave obtained by the oscillation by the laser medium to output a line beam of converted wave. The resonator further includes at least one reflector bending light path is provided in the resonator such that a longitudinal direction of the line beam of fundamental wave is approximately perpendicular to an incident plane of the reflection unit.

In addition, an image generating apparatus according to an embodiment of the invention includes a laser light source apparatus, an optical modulation unit modulating light emitted from the laser light source apparatus in response to information, and a projection optical unit. Accordingly, the laser light source apparatus according to an embodiment includes the aforementioned configuration.

As described above, in the laser light source apparatus according to an embodiment of the present invention, the longitudinal direction of the line beam of fundamental wave can be approximately perpendicular to the incident plane of the reflection unit such as the concave mirror provided within the resonator, that is, the plane formed with the light path of the reflected light containing rays of incident light and rays of reflected light. In the embodiment of the present invention, the line beam of fundamental wave may indicate light having an oblong beam shape such as light having an elliptic beam shape having a high ratio (aspect) between a major axis and a minor axis. Uniformity and stability of output light in the related-art laser light source apparatus may not be obtained by using a line beam of fundamental wave such as a multi-transversal mode fundamental wave because spatial symmetry is not obtained in the longitudinal direction of the line beam. In contrast, according to the configuration of the present embodiment, since a longitudinal direction of the line beam of fundamental wave is located in the direction approximately perpendicular to the plane of the light path of the light reflected by the reflection unit as described above, spatial symmetry can be maintained with respect to the longitudinal direction of the line beam of fundamental wave. Accordingly, asymmetry and non-uniformity of the converted wave in the longitudinal direction can be suppressed to produce uniform and stabilized output light.

According to the laser light source apparatus of an embodiment of the invention and the image generating apparatus using the laser light source apparatus, it may be possible to improve uniformity and stability of output light.

BRIEF DESCRIPTION OF THE DRAWINGS

FIGS. 5A to 5C are respectively schematic plan views of a laser light source apparatus according to a third embodiment of the present invention;

DESCRIPTION OF THE PREFERRED EMBODIMENTS

Embodiments of the present invention will be described below but it is needless to say that the present invention is not limited to those embodiments which will follow.

First Embodiment

Figure 3A:
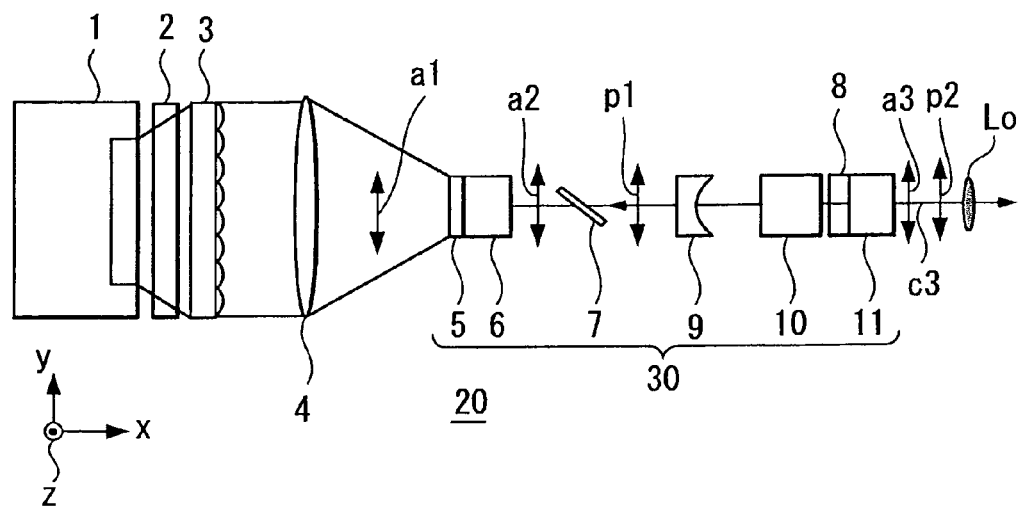
FIGS. 3A and 3B are respectively schematic plan views of a laser light source apparatus according to a first embodiment of the present invention.
Figure 3B:
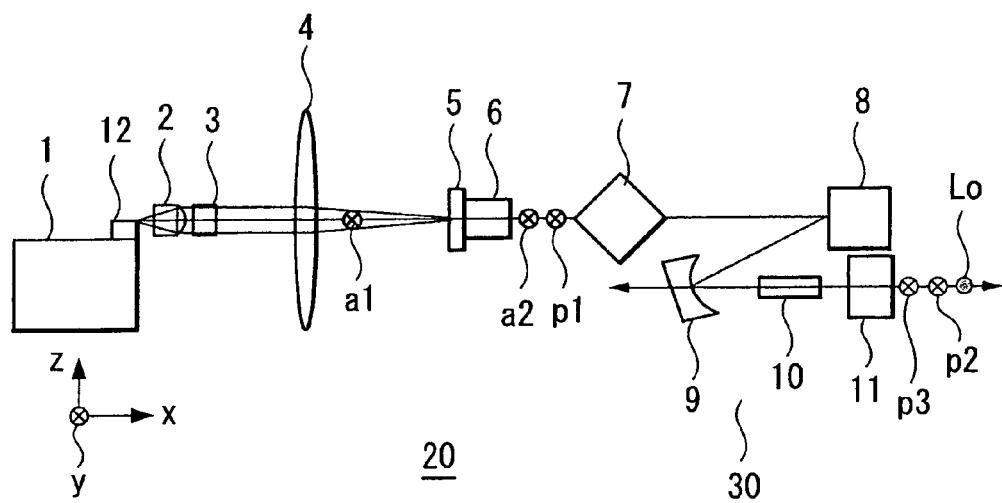

FIGS. 3A and 3B are respectively schematic plan views showing a laser light source apparatus according to an embodiment of the present invention. As shown in FIGS. 3A and 3B, the laser light source apparatus 20 includes a pumping light source 1 and a resonator 30, and the resonator 30 includes a laser medium 6, a wavelength conversion element 10 and two reflection units 8 and 9 reflecting light. FIG. 3A is a plan view showing a laser light source apparatus viewed from the direction extending along the incident plane in the light path reflected by the reflection units 8 and 9, and FIG. 3B is a plan view showing the laser light source apparatus from the direction perpendicular to the incident plane. Two collimator lenses 2 and 3, a condenser lens 4, a resonator mirror 5, the laser medium 6, a wavelength conversion element 7 and the reflection unit 8 including a plane mirror are located in the light path of light emitted from the pumping light source 1. Then, the reflection unit 9 including a concave mirror and which reflects a fundamental wave at high reflectance is located in the light path of light reflected at the reflection unit 8. The wavelength conversion element 10 including a suitable device such as a nonlinear optical crystal and a nonlinear optical device and a resonator mirror 11 are located in the light path of reflected light from the reflection unit 9. As described above, the resonator 30 includes the reflection units 8 and 9 provided in the light path between the resonator mirrors 5 and 11 thereof to form a configuration of the reflected light path, where the whole of the laser light source apparatus 20 can be reduced in size. The illustrated example shows a reflection thin-film coating with wavelength selectivity with high reflectance relative to a fundamental wave provided at the end face of one side of the laser medium 6 as the resonator mirror 5. In this case, the reflection thin-film coating with wavelength selectivity may act as the laser medium 6, and may function as a resonator plane mirror, where the number of parts can be reduced and optical adjustment can be simplified. It is needless to say that this reflection thin-film coating with wavelength selectivity may be provided as the resonator mirror 5 independently of the laser medium 6.

In this arrangement, multi-transversal mode laser light, for example, emitted from the pumping light source 1 such as a laser diode array is collimated to parallel rays of light by the collimator lenses 2 and 3. These collimator lenses 2 and 3 may be obtained by combining cylindrical lenses that collimate divergent light of respective directions of a fast-axis and a slow-axis of a laser diode, for example. The collimator lens 2 includes an aspherical cylindrical lens which collimates light in the fast-axis direction and the collimator lens 3 includes a spherical cylindrical lens array which is matched with an array pitch and a diverging angle of the light-emitting device 12 of the laser diode array. In FIGS. 3A and 3B, a direction in which the light-emitting device 12 is arranged in the pumping light source 1 such as the laser diode array, that is, a longitudinal direction of pumping light of the multi-transversal mode is set to a Y-axis direction and a direction extending along the light path of light emitted from the pumping light source 1 is set to a X-axis direction. The minor-axis direction of multi-transversal mode beam is set to a Z-axis direction. In this case, laser beam bundles of an X-Z plane are collimated by the collimator lens 2 and laser beam bundles of a Y-Z plane are collimated by the collimator lens 3.

When the laser diode is used, although light has a large diverging angle in the X-Z plane as compared with the Y-Z plane, different cylindrical lenses are used for respective planes so that a desired beam shape can be provided by independently controlling diameters of emitted light beams. Also, when astigmatism due to a size of a light-emitting region of a laser diode is observed, it is preferable that the above-described cylindrical lens be used to adjust astigmatism.

Light passed through these collimator lenses 2 and 3 are converged by the condenser lens 4 of the later stage and irradiated on one end of the laser medium 6 through the resonator mirror 5 as line beams of which longitudinal direction is set to a direction (Y-axis direction) shown by an arrow a1. This example shows that the resonator mirror 5 is provided at an incident end face of the laser medium 6 as a reflection thin-film coating having wavelength selectivity. The resonator mirror 5 is configured such that the resonator passes light emitted from the pumping light source 1 at high transmittance and reflects a fundamental wave pumped by the laser medium 6 at high reflectance. Then, the line beam of fundamental wave pumped by the laser medium 6 is adjusted by the wavelength selection device 7 including a Brewster plate having a wavelength selection function, for example, as a line beam of which longitudinal direction is set to a direction (Y-axis direction similarly to the direction shown by the above-described arrow a1) shown by an arrow a2 such that polarization direction thereof is shown by an arrow p1 and reflected by the reflection unit 8 reflecting a fundamental wave at high reflectance. Further, the line beam of fundamental wave similarly reflected at the reflection unit 9 and reflected later is incident on the wavelength conversion element 10 including the nonlinear optical crystal or nonlinear optical device. The line beam of fundamental wave reached to the resonator mirror 11 through the wavelength conversion element 10 is reflected therein and reciprocated within the resonator 30.

In the wavelength conversion element 10, converted waves such as a second harmonic wave are generated in two directions extending along the light path of the resonator 30. One converted wave is emitted to the side of the reflection unit 9 and outputted to the outside through the reflection unit 9 having high transmittance relative to the converted wave. Light emitted to the side of the resonator mirror 11 from the wavelength conversion element 10 and outputted to the outside as a line beam of which longitudinal direction is shown by an arrow a3 through the resonator mirror 11 with high transmittance relative to the converted wave. A polarization direction of the converted wave is shown by an arrow p2. It should be noted that selection conditions of the polarization directions of the line beam of fundamental wave and the converted waves will be described later. It should be noted that, if the reflection unit 9 is designed to have high reflectance relative to the line beam of fundamental wave and high transmittance relative to the converted waves and the resonator mirror 11 is designed to have high reflectance relative to the line beam of fundamental wave and the converted waves, then one converted wave can be superposed on the other converted wave and outputted. In this case, it may be possible to reduce in size the apparatus while utilization efficiency of light can be enhanced. Also, if the reflection unit 8 is designed to have high reflectance relative to the line beam of fundamental wave and high transmittance relative to the converted waves, it may be possible to prevent the converted waves from being leaked into the pumping light source. In this case, a very small amount of converted waves leaked into the side of the reflection unit 8 or the resonator mirror 11 can be used as monitor waves.

In the laser light source apparatus for carrying out wavelength conversion within the resonator, in order to increase conversion efficiency, it is desirable that a power density of a fundamental wave resonated in the inside of the wavelength conversion element be increased. An arrangement in which a concave mirror, for example, is used as a reflection unit for collimating light to provide approximately parallel light in the light path in which a fundamental wave generated in the laser medium is resonated within the resonator and in which reflected fundamental resonating light is converged to the wavelength conversion element is given as an arrangement of the resonator that can achieve such effects as shown in the example shown in FIGS. 3A and 3B. By way of example, in a reciprocal resonator, plane mirrors may be located in both ends; a concave mirror with a radius of curvature of 100 mm may be located in the light path. A distance between one plane mirror and the concave mirror may be selected to be sufficiently longer than a focal length of the concave mirror (in this case, about 50 mm) in a range of stable resonance conditions. The laser medium may be located between one plane mirror and the concave mirror, and the other concave mirror may be located in the position unequal to about a focal length of the concave mirror. The wavelength conversion element may be located near the plane mirror. According to this arrangement, in the light path of the resonator in which the laser medium is contained in the light path, light is approximately parallel with a size of large mode so that heat effect can be difficult to obtain in the laser medium. In addition, since resonance light is converged in the wavelength conversion element, the mode size is small and wavelength converted light can be obtained at high efficiency by sufficiently increasing the power density of the line beam of fundamental wave.

Second Embodiment

Figure 4A:
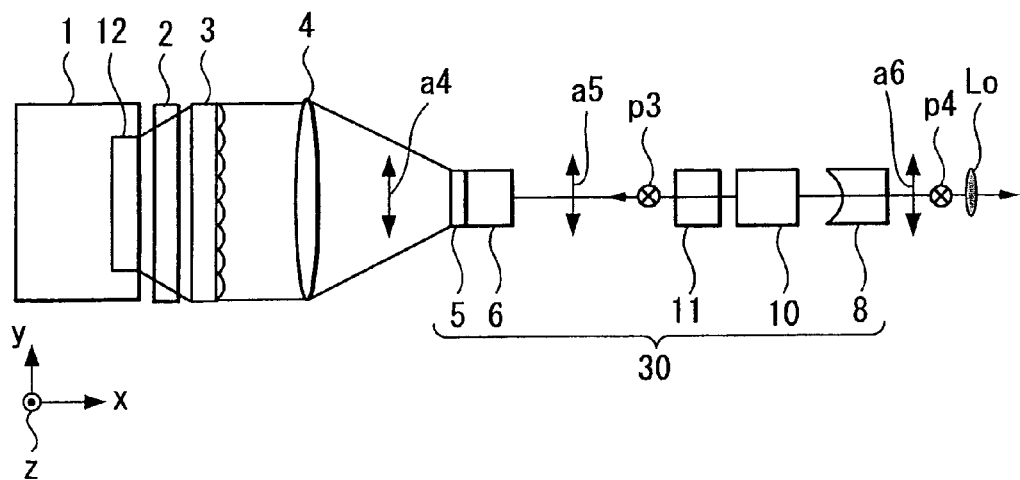
FIGS. 4A and 4B are respectively schematic plan views of a laser light source apparatus according to a second embodiment of the present invention.
Figure 4B:
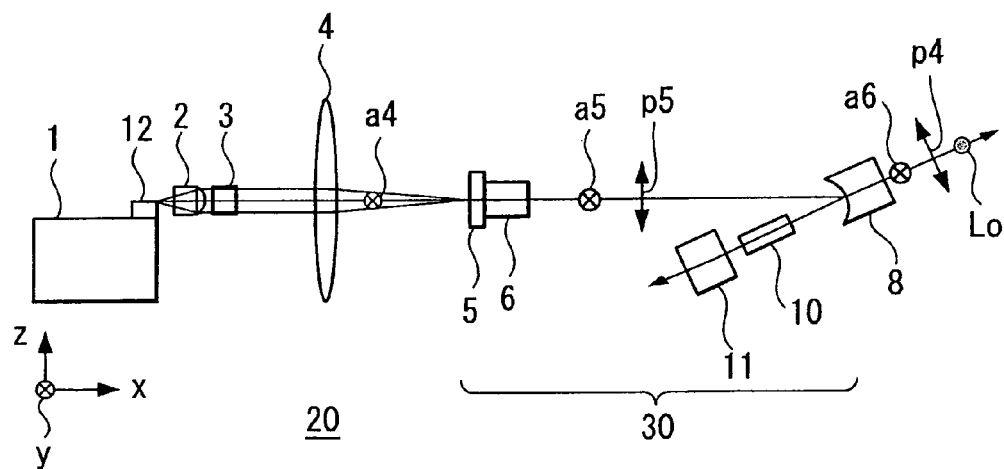

Next, an embodiment in which the reflection unit 9 shown in FIGS. 3A and 3B is removed and in which the wavelength conversion element 11 is located between the reflection unit 8 and the resonator mirror 11 in the light path of light reflected by the reflection unit 8 as shown in FIGS. 4A and 4B will be described as a second embodiment of the present invention. In FIGS. 4A and 4B, elements and parts identical to those of FIGS. 3A and 3B are denoted by identical reference numerals and therefore need not be described repeatedly. This embodiment illustrates an example in which the reflection unit 8 and the resonator mirror 11 have wavelength selection functions to reflect a fundamental wave at high reflectance and to pass a converted wave at high transmittance. In FIGS. 4A and 4B, longitudinal directions of pumping light, a fundamental wave and a converted wave are shown by arrows a4, a5 and a6, respectively. Also, polarization directions of pumping light and a converted wave are shown by arrows p3 and p4, respectively. That is, in this case, this example shows the longitudinal directions of a line beam of fundamental wave and a converted wave and polarization directions thereof that are approximately crossing each other at a right angle. A converted wave such as second higher harmonic wave is passed through the reflection unit 8 and outputted. When the resonator mirror 11 is configured to have high reflectance relative to a fundamental wave and a converted wave, it may be possible to reflect a converted wave outputted to the side of the resonator mirror 11, to superpose the reflected converted wave on a converted wave outputted to the side of the reflection mirror 8 and to output a superposed converted wave at high efficiency. As described above, when the reflection unit such as the concave mirror is omitted, the number of parts can be decreased and the laser light source apparatus can become highly reliable. Also in this case, it may be possible to use a very small amount of converted wave leaked to the side of the resonator mirror 11 as a monitor converted wave.

In the above-mentioned first and second embodiments of the present invention, a so-called end pumping system is shown as an excitation system. That is, these cases show examples of an end face excitation system for irradiating pumping light from the pumping light source 1 to the laser medium 6 at its end portion of the direction extending along the laser resonance light path. When the excitation system is designed as the end pumping system as described above, the longitudinal direction of emitted light of multi-transversal mode pattern emitted from the pumping light source 1 is located so as to be approximately perpendicular to the plane formed with the oscillation light path of a line beam of fundamental wave oscillated within the resonator 30, where the longitudinal direction of this line beam of fundamental wave can be located approximately vertical to the incident plane of the reflection unit 8 provided in the resonator 30.

On the other hand, the excitation system may be designed as a side pumping system, that is, a side excitation system for irradiating pumping light to the laser medium at its side surface extending along the laser resonance light path. In this case, the incident direction in which light from the pumping light source is incident on the laser medium is located so as to be approximately perpendicular to the plane formed with the oscillation light path of the line beam of fundamental wave oscillating within the resonator, where the longitudinal direction of the line beam of fundamental wave can be approximately vertical to the incident plane of the reflection unit provided in the resonator. Next, an embodiment in which the excitation system is designed as the side pumping system will be described.

Third Embodiment

Figure 5B:
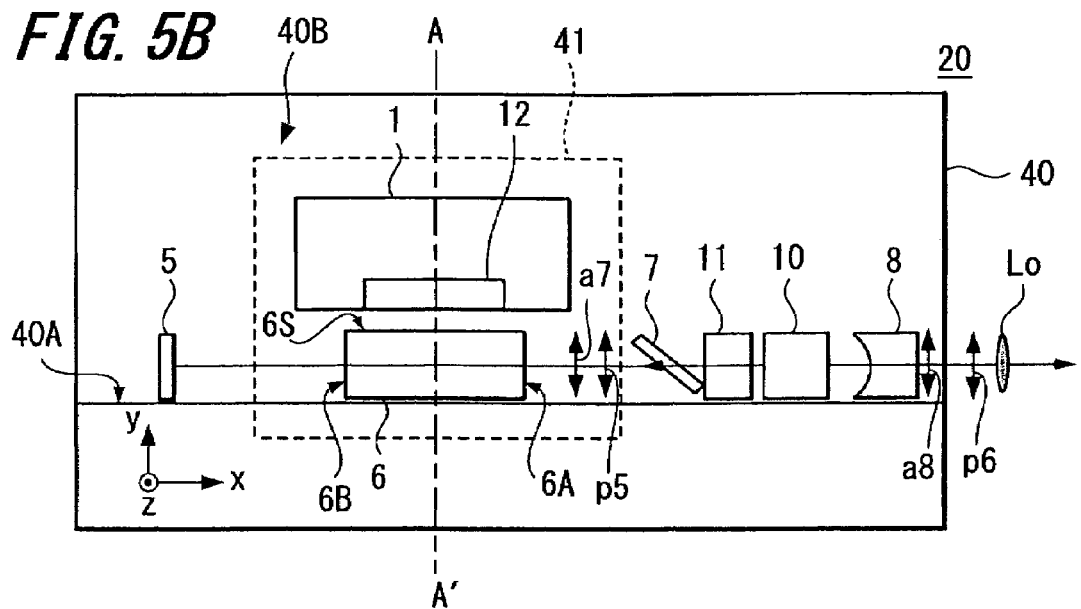
Figure 5B:
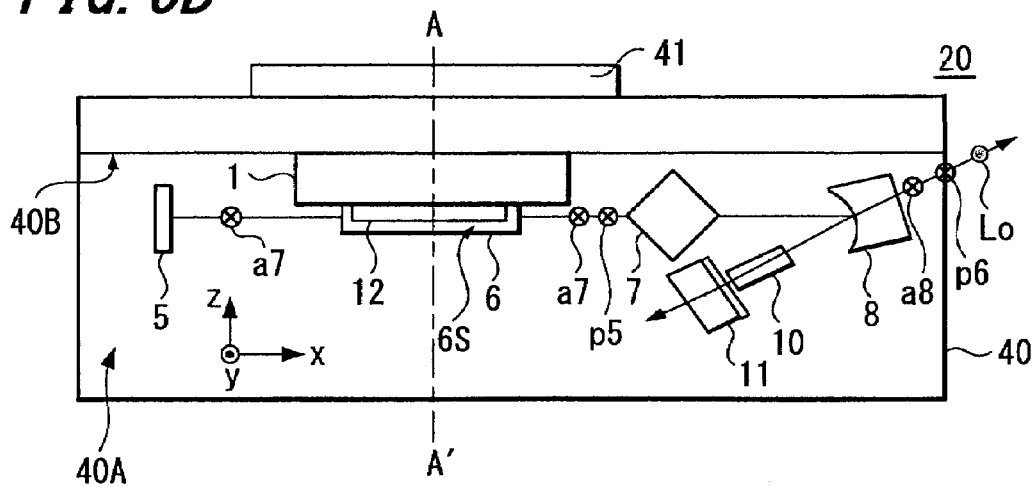
Figure 5C:
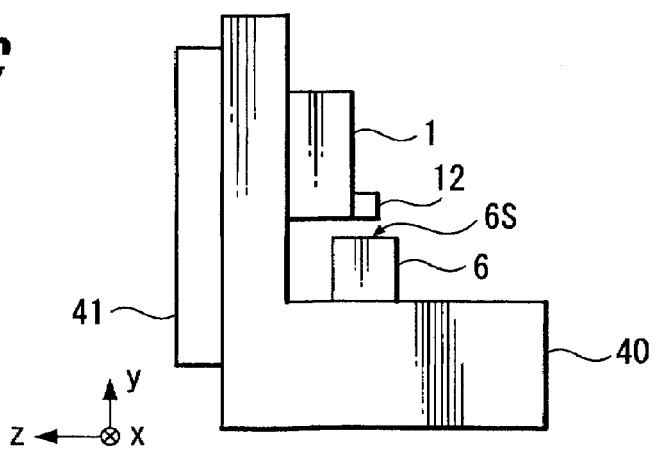

FIGS. 5A to 5C respectively show schematic diagrams of a laser light source apparatus according to a third embodiment of the present invention in which an excitation system thereof is designed as a side pumping system. FIGS. 5A and 5B show a schematic side view and a schematic top view of the laser light source apparatus 20. FIG. 5C is a schematic cross-sectional view taken along the lines A-A' in FIGS. 5A and 5B. In FIGS. 5A to 5C, elements and parts identical to those of FIGS. 3A, 3B and FIGS. 4A, 4B are denoted by identical reference numerals and therefore need not be described repeatedly. In this embodiment, the longitudinal direction of emitted light of multi-transversal mode pattern emitted from the pumping light source 1 be approximately parallel to the plane formed with the longitudinal direction of the line beam of fundamental wave oscillated within the resonator 30 and the direction extending along the oscillation light path of the line beam of fundamental wave. Then, respective optical parts forming the pumping light source 1 and the resonator 30 are located on first and second planes 40A and 40B approximately perpendicular to each other on a supporting body 40 having a approximately L-shape cross-section. The resonator mirror 5, the laser medium 6, the wavelength selection element 7 and the reflection unit 8 are located on the first plane 40A and the wavelength conversion element 10 and the resonator mirror 11 are located in the light path of reflected light from the reflection unit 8. The pumping light source 1 is located on the second plane 40B and pumping light emitted from the parallel light-emitting device 12 including a laser diode array is irradiated on a side surface 6S (in this case, top surface) of the laser medium 6 on the first plane 40A.

In the above-mentioned arrangement, when the pumping light emitted from the pumping light source 1 is irradiated on the side surface 6S of the laser medium 6, a fundamental wave is oscillated in the laser medium 6 and outputted from the end faces 6A and 6B of the laser medium 6. The line beam of fundamental wave outputted from one end face 6B is reflected by the resonator mirror 5, returned to the laser medium 6, superposed on the line beam of fundamental wave outputted to the side of the other end face 6A, outputted as a line beam and reciprocated between the resonator mirrors 5 and 11.

When a line laser beam is incident on the side surface 6S of the laser medium 6 from the pumping light source 1, if the longitudinal direction of laser light emitted from the pumping light source 1 is parallel to the plane formed with the incident direction of laser light incident on the laser medium 6 from the pumping light source 1 and the direction in which the line beam of fundamental wave emitted from the laser medium 6 travels, then the longitudinal direction of the line beam of fundamental wave emitted from the laser medium 6 also becomes a direction extending along this plane. Accordingly, when the incident direction of the pumping light incident on the laser medium 6 from the pumping light source 1 is arranged so as to become approximately perpendicular to the plane formed with the oscillation light path of the line beam of fundamental wave oscillated within the resonator 30, the longitudinal direction of the line beam of fundamental wave may be approximately perpendicular to the incident plane of the reflection unit 8 provided in the resonator 30.

As illustrated example, the longitudinal direction of the line beam of fundamental wave is located in the direction approximately crossing the optical axis at a right angle, extending along the sheet of drawing of FIG. 5A and forms approximately perpendicular to the sheet of drawing of FIG. 5B as shown by an arrow a7. Similar to the examples shown in FIGS. 4A and 4B, the reflection unit 8 is configured so as to reflect a fundamental wave at high reflectance and to pass a converted wave converted by the wavelength conversion element 10 at high transmittance, where the converted wave is passed through the reflection unit 8 and outputted as a line beam of which direction approximately perpendicular to the optical axis extends along the sheet of drawing of FIG. 5A and which is approximately perpendicular to the sheet of drawing of FIG. 5B is set to the longitudinal direction. The resonator mirror 11 may be configured so as to have high reflectance relative to both of the line beam of fundamental wave and the converted wave and leakage light may be used as monitor light. Alternatively, the resonator mirror 11 may be configured so as to reflect the line beam of fundamental wave at high reflectance and to pass the converted wave. In this example, the polarization direction of the line beam of fundamental wave is shown by an arrow p5 and the polarization direction of the converted wave is shown by an arrow p6, respectively.

It should be noted that, when the respective units are located on the supporting body 40 as described above, a heat exhausting unit 41 including a suitable device such as a Peltier device may be provided at the back of the second plane 40B in which the pumping light source 1, for example, is located. The pumping light source 1 and the laser medium 6 generate heat and therefore they need to exhaust heat properly. In particular, since much of absorbed pumping light, which do not contribute to oscillation, are converted into heat not only in the pumping light source 1 but also in the laser medium 6, it is desirable that heat be exhausted from the pumping light source 1 and the laser medium 6 by the heat exhausting unit 41. If the supporting body 40 is formed of a material with excellent thermal conductivity such as copper and aluminum and heat is exhausted from this supporting body 40 by the heat exhausting unit 41 such as the Peltier device located in the back of the pumping light source 1, then heat can be efficiently exhausted from the pumping light source 1 and the laser medium 6. Thus, it may be possible to provide a highly-stable and highly-reliable laser light source apparatus 20.

While the parallel light source including the laser diode, that is, so-called laser diode array can be used as the pumping light source 1 in any case of the above-described first to third embodiments, it is needless to say that the pumping light source is not limited to the laser diode array. In addition, while the microlenses are located both in the vertical and horizontal directions to convert pumping light into parallel beams and the lens for condensing light on the laser medium in the first and second embodiments, the direct excitation system from the side surface of the laser medium 6 is used in the third embodiment and it is desirable that proper pumping light be properly beam-shaped and irradiated onto the laser medium 6 in response to uses.

As the laser medium for use with the laser light source apparatus according to an embodiment of the present invention, in response to uses, it may be possible to select solid-state laser materials with rare earth materials added such as Nd:YAG, Nd:YVO$_4$, Nd:GdVO$_4$ and Yb:YAG which result from doping yttrium aluminum garnet ($Y_3Al_5O_{12}$) by Nd ions when light is wavelength-converted into blue and green regions, for example. YAG and the like have other oscillation lines near available wavelengths. In this case, as shown in the example of FIGS. 3A and 3B, it is desirable that the wavelength selection element 7 to suppress parasitic oscillation be located within the resonator. For example, a double refraction filter including a crystal can be used as the wavelength selection element 7. When this wavelength selection element 7 is located by effectively utilizing a Brewster angle as shown in FIGS. 3A and 3B, the wavelength selection element 7 may have a polarized light selection function in addition to the wavelength selection function. The example shown in FIGS. 3A and 3B illustrates an example to select polarized light parallel to the longitudinal direction of the line beam of fundamental wave. In uses free from a problem of parasitic oscillation, a Brewster plate such as quartz and optical glass may be used instead of the double refraction filter including a crystal.

Further, when laser medium material with anisotropy in absorption properties and oscillation properties, such as $YVO_4$ is used as a laser medium, it is desirable that the polarization direction of the pumping light source, that is, the polarization direction absorbed in the $YVO_4$ be matched with the polarization direction of $YVO_4$ to be oscillated. When a pumping light source is a laser diode, it is desirable that a polarization direction thereof be rotated approximately 90 degrees to be a desired polarization direction using a suitable device such as a half-wave plate (not shown) before pumping light is incident on the resonator depending on oscillating polarized light. In that case, if the polarization direction is stabilized to an extent that it is enough for uses, then the Brewster plate, which is the polarization selection element, can be omitted. FIGS. 4A and 4B illustrate the example in which the polarization direction of the pumping light source is vertical to the longitudinal direction of the beam. It should be noted that the shape of the laser medium is not limited to a rectangular prism and that it may be shapes including an inclined plane or a curved surface partly.

In the laser light source apparatus according to an embodiment of the present invention, the wavelength conversion element is used for wavelength conversion such as second harmonic wave generation, sum-frequency generation, parametric oscillation and third harmonic wave generation, for example. Nonlinear optical materials such as $KTiOPO_4$ (KTP), $\beta\text{-}BAB_2O_4$(BBO), $LiB_3O_5$(LBO), $MgO\text{:}LiNbO_3$, PP-$KTiOPO_4$, PP-$MgO\text{:}LiNbO_3$, PP-$MgO\text{:}S\text{-}LiNbO_3$, PP-S-$LiTaO_3$, PP-$MgO\text{:}S\text{-}LiTaO_3$ may be given as available materials. It should be noted that "PP" means "Periodical poling" (that is, periodically-poled structure), where a nonlinear optical device having a periodically-poled structure is obtained by periodically-poled control based on application of a voltage to a nonlinear optical crystal. In these materials, (quasi-) phase-matching conditions are satisfied by processing these materials at proper angles which satisfy the phase matching conditions or making a proper periodically-poled structure in accordance with available wavelengths. "S" means "Stoichiometric (stoichiometric composition)". Further, it is desirable that the size of the wavelength conversion element be larger than a line beam size of a fundamental wave or converted wave within the resonator by a proper amount.

It should be noted that the polarization direction of the line beam of fundamental wave incident on the wavelength conversion element be matched with the proper direction of the wavelength conversion element in accordance with the phase matching conditions. For example, when a fundamental wave having a polarization direction in the z-direction (direction vertical to a wafer surface) of the crystal is incident on the PPSLT, higher harmonic waves of the same polarization direction can be generated efficiently. In this case, while it is suitable that periodically-poled inversion be carried out such that higher harmonic wave may be propagated into the direction of the wafer surface using the c-axis as the normal direction, since the thickness of the wafer is approximately 1 mm or less, it is desirable that the longitudinal direction of the beam be set to the direction of the wafer surface. Accordingly, the polarization direction of this case be the direction approximately perpendicular to the longitudinal direction as to both of the line beam of fundamental wave and the converted wave as shown in the example shown in FIGS. 4A and 4B. On the other hand, since the device size may be larger to some extent, for example, about several millimeters square in the wavelength conversion element which does not use periodically-poled inversion, such as LBO, as in the example shown in FIGS. 3A, 3B and FIGS. 5A to 5C, the polarization direction can be made parallel to the longitudinal direction of the beam in response to crystal azimuth having available nonlinear properties, the phase thereof matching conditions and uses or the polarization direction can be made perpendicular to the longitudinal direction of the beam, although not shown.

Then, since the laser light source apparatus according to an embodiment of the present invention is configured such that the longitudinal direction of the line beam of fundamental wave is approximately perpendicular to the incident plane on the reflection units 8 and 9 of the concave mirror, as compared with the laser light source apparatus having the related-art arrangement in which the longitudinal direction is located within the incident plane, an aberration amount can be decreased sufficiently insofar as the angle of incident is uniform.

Figure 1A:
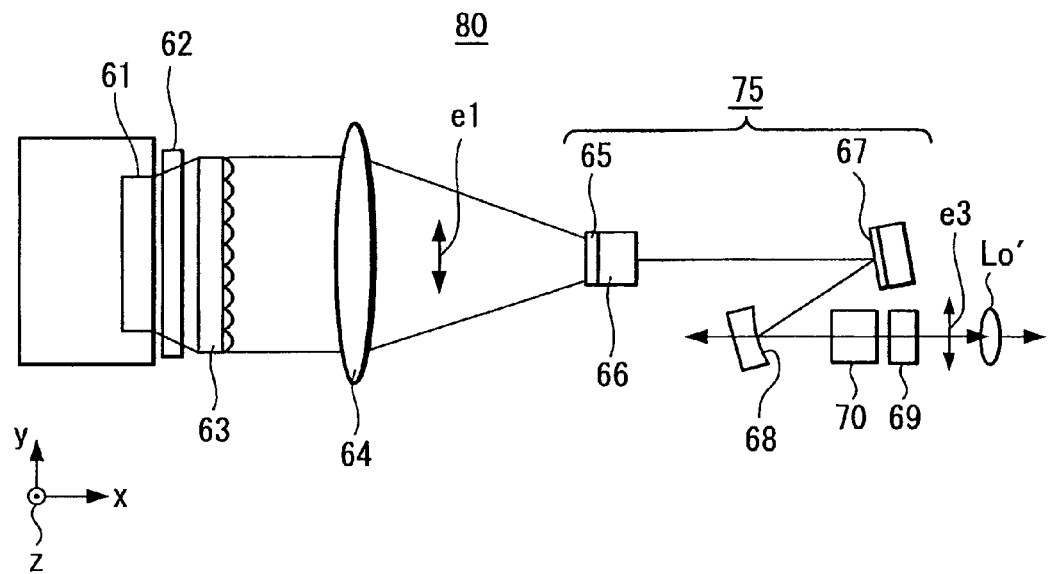
FIGS. 1A and 1B are respectively schematic plan views of a laser light source apparatus according to the related art.
Figure 1B:
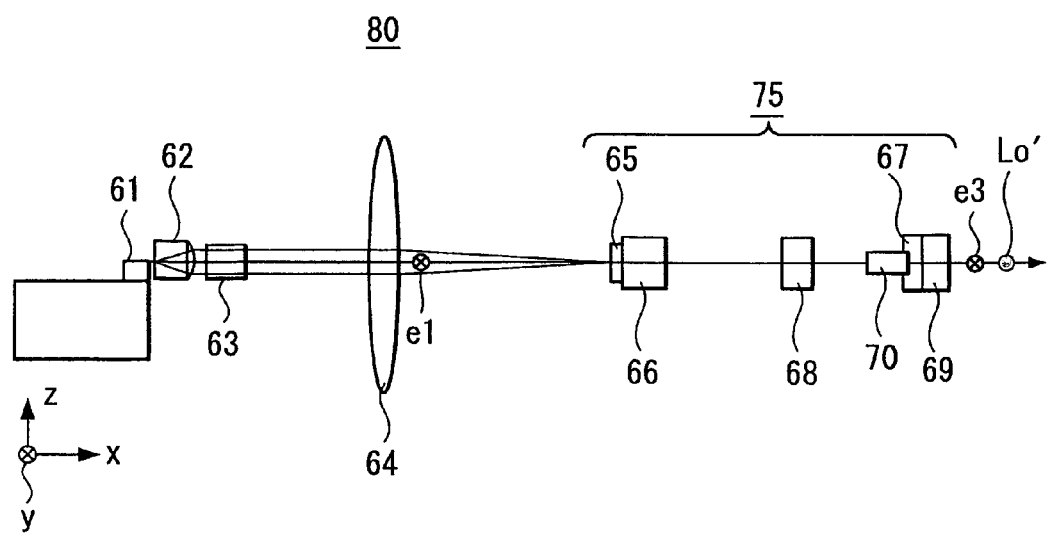
Figure 2:
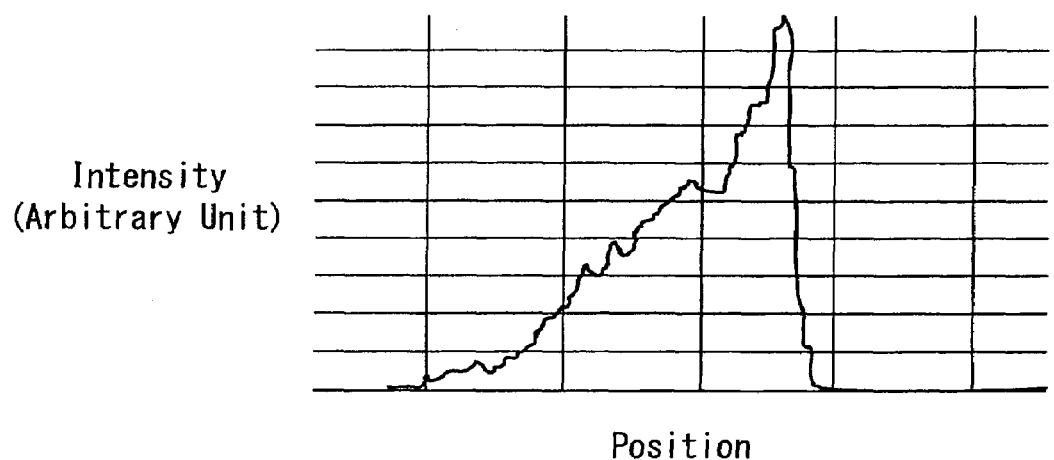
FIG. 2 is a diagram showing an intensity distribution of outputted light in a related-art laser light source apparatus.

In the case of the related art, as described in FIGS. 1A and 1B, since the oscillation light path of the resonator lies within the same plane as the longitudinal direction of the beam, the arrangement of the resonator is not symmetrical to the longitudinal direction of the beam, that is, the oscillation light path is not symmetrical to the longitudinal direction of the beam. When the light path of the resonator becomes asymmetrical to the longitudinal direction of the beam as described above, as shown in FIG. 2, non-uniformity is obtained in the intensity distribution so that the power density of the line beam of fundamental wave be non-uniform, thereby causing a spatial non-uniformity to occur in the converted wave. Also, in order to decrease asymmetry of the wide line beam of fundamental wave, the resonator length may be increased by suppressing the angle of incident of the reflection unit which reflects the light path of the resonator, for example, which may prevent the laser from having a high efficiency and which may prevent the laser from being reduced in size. Further, from a standpoint of manufacturing a laser module, a laser beam is a non-uniform laser beam, which may prevent from obtaining sufficiently large margins relative to fluctuations of the longitudinal direction of the beam.

Figure 6:
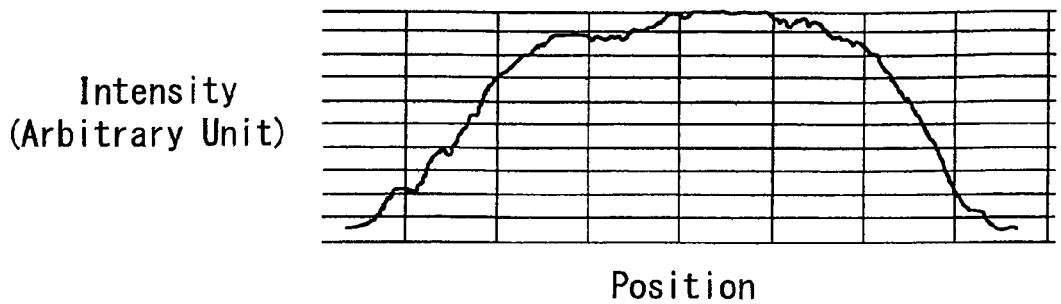
FIG. 6 is a diagram showing an intensity distribution of outputted light in a laser light source apparatus according to an inventive example.

On the other hand, in the laser light source apparatus having the configuration according to an embodiment of the present invention, as shown in FIG. 6, there can be obtained an intensity distribution which is approximately uniformly oscillated with respect to the longitudinal direction of the beam. As a result, the spatial mode can be oscillated on average up to the high-order mode and an excellent symmetry in the oscillating line beam of fundamental wave may be obtained. A converted wave after it was wavelength-converted becomes a beam shape which is equal and uniform spatially. Moreover, since the beam shape has an excellent symmetry, it may be difficult to obtain power transition between the spatial modes due to disturbance such as vibrations. As a consequence, when the laser light source apparatus according to an embodiment of the present invention is applied to the image generating apparatus using a one-dimensional light modulation apparatus and an optical process apparatus, for example, a line laser beam can be homogenized, utilization efficiency and stability can be improved while noises can be decreased. Further, a manufacturing margin of a laser module may be expanded.

In the laser light source apparatus according to an embodiment of the present invention, end faces of at least one side of the entrance and exit faces of the laser medium and the wavelength conversion element may be processed so as to have a approximately Brewster angle relative to entrance and exit of the line beam of fundamental wave. If the respective parts are located and configured such that the line beam of fundamental wave may have polarization within the planes of incident of the laser medium and the wavelength conversion element at their end faces processed so as to have Brewster angles, then it may be possible to decrease a transmission loss. Also, if the laser light source apparatus is configured such that the polarization direction of the line beam of converted wave generated in the wavelength conversion element may be approximately parallel to the polarization direction of the line beam of fundamental wave, it may be possible to decrease a transmission loss of the converted wave at the end faces processed so as to have the Brewster angles. Next, an embodiment in which the laser medium and the wavelength conversion element are processed so as to have Brewster angles will be described.

Fourth Embodiment

Figure 7A:
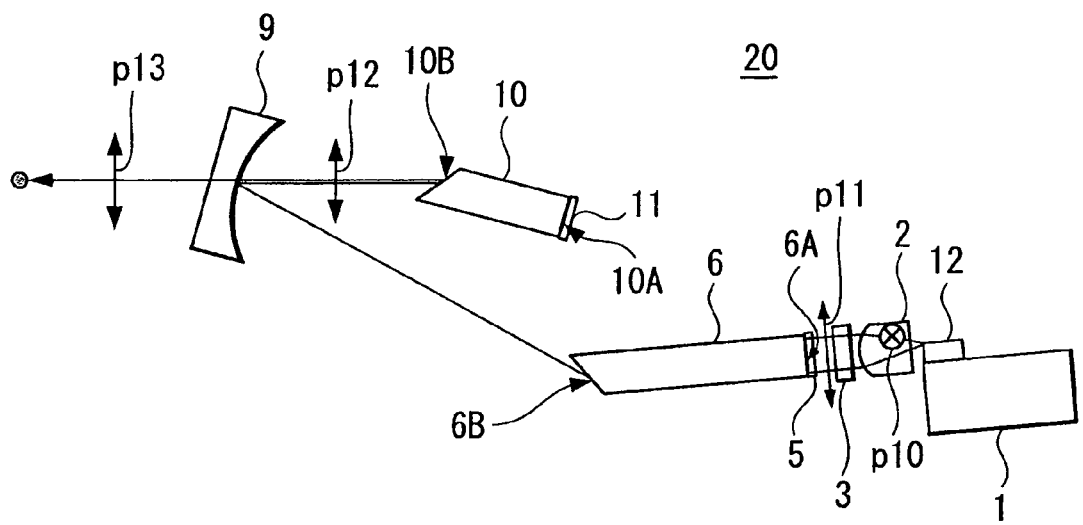
FIGS. 7A and 7B are respectively schematic plan views of a laser light source apparatus according to a fourth embodiment of the present invention.
Figure 7B:
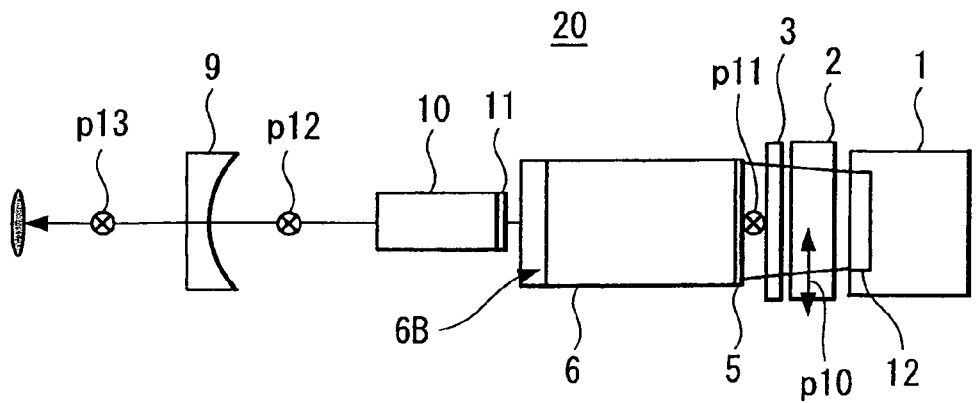

FIGS. 7A and 7B are schematic plan views showing an example of a laser light source apparatus according to an embodiment of the present invention. FIG. 7A shows a plan view of the plane extending along the incident plane in the reflection light path within the resonator, and FIG. 7B shows a schematic plan view seen from the direction extending along the incident plane.

The example shown in FIGS. 7A and 7B shows a case using an end-pumping system which introduces pumping light from the end face extending along the resonator direction of the laser medium and illustrates an example in which one end face 6B of the laser medium 6 and one end face 10B of the wavelength conversion element 10 are provided as Brewster faces having Brewster angles relative to the line beam of fundamental wave. The collimator lens 2, the half-wave plate 13 and the resonator mirror 5 are located in the light path of pumping light emitted from the pumping light source 1. Then, since polarized light within the sheet of drawing shown by an arrow p11 in FIG. 7A is passed through the Brewster face at high transmittance, the Brewster face can function as the polarization selection element. Then, the reflection unit 9 including the concave mirror is located in the light path of emitted light and the wavelength conversion element 10 is located on the reflection light path. The end face 10B of the wavelength conversion element 10 at its side opposing to the reflection unit 9 is formed as the Brewster face and the resonator mirror 11 is provided on the other end face 10A. Here, the resonator mirrors 5 and 11 have high reflectance relative to a fundamental wave. Further, the reflection unit 9 has high reflectance relative to a fundamental wave and has high transmittance relative to a converted wave. Further, the resonator mirror 11 is configured so as to have high reflectance relative to a fundamental wave and a converted wave, for example.

In the above-mentioned arrangement, pumping light emitted from the pumping light source 1 is collimated in the emitter thickness direction of the light-emitting device 12 by the collimator lens 2 such as a cylindrical lens and incident on the laser medium 6 from one end face 6A through the half-wave plate 13. At that time, if the laser medium 6 is an anisotropic medium, for example, Nd:YVO$_4$ in which crystal azimuths with high absorption efficiency and high oscillation efficiency, for example, are the same c-axis direction, when a pumping light source in which the oscillation polarization direction of the laser diode is parallel to the emitter thickness direction, as shown in the examples shown in FIGS. 7A and 7B, it is preferable that polarized light may be rotated 90 degrees by the half-wave plate 13 and thereby matched with the polarization direction of the line beam of fundamental wave to be resonated before it is incident on the laser medium 6. That is, in this case, the polarization direction of light emitted from the light-emitting device 12 of the pumping light source 1 is the direction perpendicular to the optical axis and the sheet of drawing of FIG. 7A as shown by an arrow p10 and the polarization direction is changed by the half-wave plate 13 to the direction perpendicular to the optical axis as shown by an arrow p11, which extends along the sheet of drawing in FIG. 7A and which becomes perpendicular to the sheet of drawing in FIG. 7B. Since the other end face 6B of the laser medium 6 is used as the Brewster face, light of the polarization direction shown by this arrow p11 is emitted at high transmittance. In this example, functions of three devices of the resonator mirror, the laser medium and the Brewster plate can be realized by one device so that the number of parts can be decreased. A fundamental wave emitted from the laser medium 6 and which is reflected at the reflection unit 9 is incident on the wavelength conversion element 10. Since the face having the Brewster angle relative to the line beam of fundamental wave is configured on one end face 10B of the wavelength conversion element 10, light with polarization within the sheet of drawing in FIG. 7A can be passed at high transmittance, an optical loss within the resonator can be suppressed to be low and highly-efficient fundamental wave oscillation can be obtained.

Since the polarization direction is set to be approximately perpendicular to the longitudinal direction of the line beam of fundamental wave, the angle polarization direction emitted from the Brewster face becomes the direction extending along the sheet of drawing in FIG. 7A (direction perpendicular to the sheet of drawing in FIG. 7B), that is, the direction extending along the incident plane in the reflection unit 9 of the light path of the resonator. Respective optical parts can be located and easily configured. It should be noted that the Brewster angles of the line beam of fundamental wave and the converted wave such as higher harmonic waves are generally close to each other so that a reflection loss relative to the converted wave is sufficiently small. Therefore, an antireflection thin-film coating to decrease a reflection loss need not be provided.

According to the above-mentioned arrangement, a resonator can be configured between the resonator mirror 5 provided at one end face of the laser medium 6 and the resonator mirror 11 provided at one end face of the wavelength conversion element 10 through the reflection unit 9 such as the concave mirror. According to an embodiment of the present invention, since the longitudinal direction of the line beam of fundamental wave is located in the direction perpendicular to polarized light, that is, the direction perpendicular to the sheet of drawing in FIG. 7A and which is extending along the sheet of drawing in FIG. 7B so that the longitudinal direction of the line beam of fundamental wave is approximately perpendicular to the incident plane in the reflection unit 9, the angle of incident in the reflection unit 9 can be decreased in the state in which parts are few or an optical loss of the resonator is small. At the same time, as compared with the arrangement in which the longitudinal direction of the line beam of fundamental wave is located in the direction extending along the incident plane of the reflection unit 9, symmetry of the longitudinal direction of the beam can be improved, a uniform and stable beam shape can be obtained and a spatial mode can be uniformly oscillated up to a high-order mode. Also, regardless of disturbance such as vibrations, since an excellent symmetry of the beam shape is obtained, it is difficult to obtain power transition between the spatial. Thus, when the laser light source apparatus according to an embodiment of the present invention is applied to the image generating apparatus and the optical process apparatus, uniformity of a line laser beam, utilization efficiency and stability can be improved and noises can be decreased. In addition, a manufacturing margin of a laser module can be expanded.

Fifth Embodiment

Figure 8A:
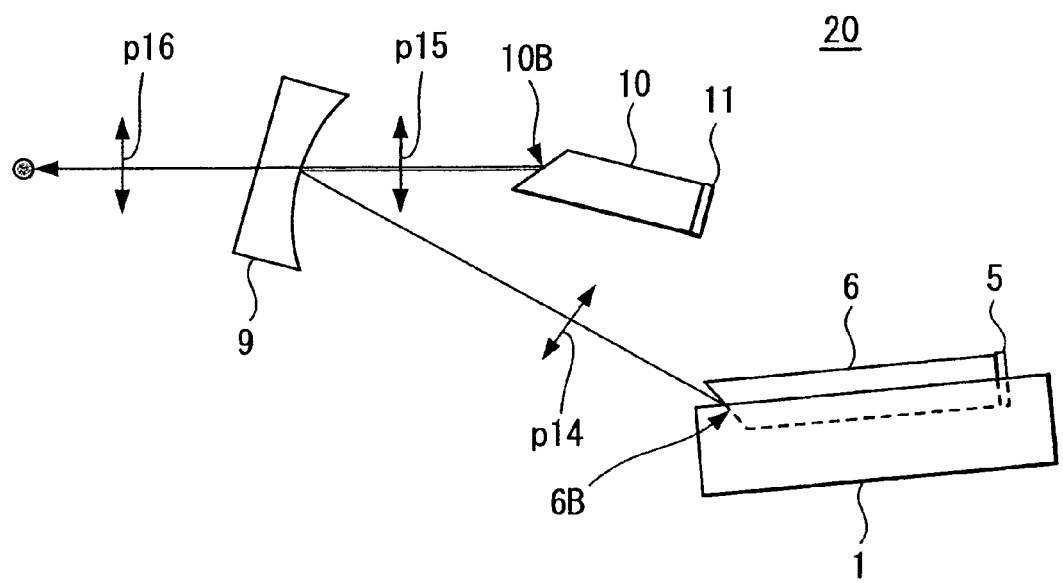
FIGS. 8A and 8B are respectively schematic plan views of a laser light source apparatus according to a fifth embodiment of the present invention.
Figure 8B:
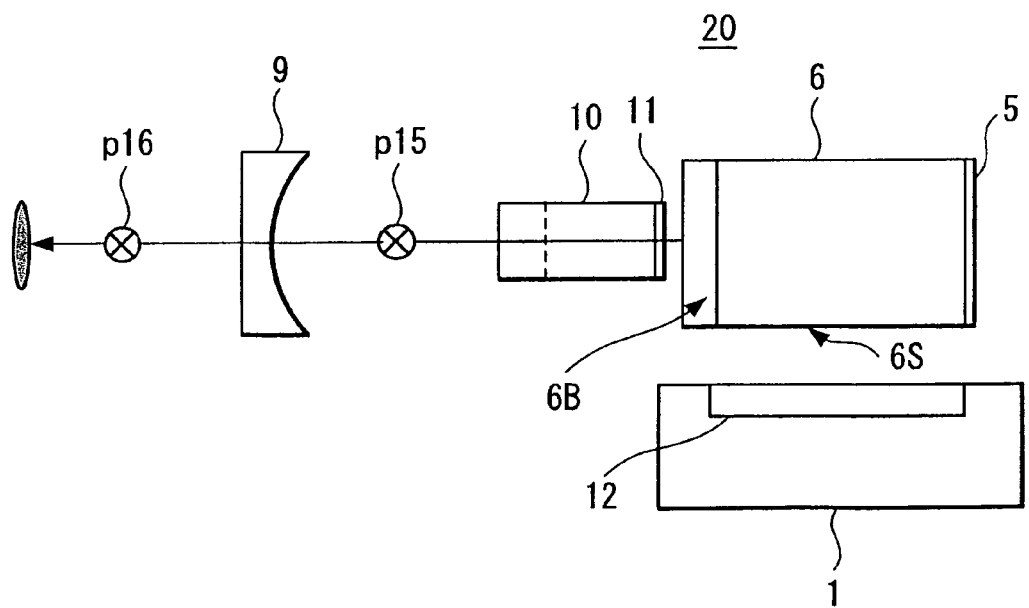

FIGS. 8A and 8B show an example in which the pumping light source 1 is located in the form of a so-called side pumping system. In FIGS. 8A and 8B, elements and parts identical to those of FIGS. 7A and 7B are denoted by identical reference numerals and therefore are not be described repeatedly. This example shows one end faces 6B and 10B of the laser medium 6 and the wavelength conversion element 10 that are formed as Brewster faces having Brewster angles relative to a fundamental wave, pumping light from the pumping light source 1 being irradiated from the side surface 6S. The polarization direction of a fundamental wave oscillating in the laser medium 6 is the direction perpendicular to the optical axis and which is extending along the sheet of drawing in FIG. 8A as shown by arrows p14 and p15 and is perpendicular to the sheet of drawing in FIG. 8B so that the line beam of fundamental wave is incident on and emitted from the laser medium 6 and the wavelength conversion element 10 at high transmittance. In this case, the angle of incident in the reflection unit 9 can be decreased in the state in which the parts are few and in which an optical loss of the resonator is small similar to the above-mentioned example shown in FIGS. 7A and 7B. At the same time, as compared with the arrangement in which the longitudinal direction of the line beam of fundamental wave is located in the direction extending along the incident plane of the reflection unit 9, symmetry of the longitudinal direction of the beam can be improved, a uniform and stable beam shape can be obtained and a spatial mode can be uniformly oscillated up to a high-order mode. Also, regardless of disturbance such as vibrations, since an excellent symmetry of the beam shape is obtained, it may be difficult to obtain power transition between the spatial. Thus, when the laser light source apparatus according to an embodiment of the present invention is applied to the image generating apparatus and the optical process apparatus, uniformity of a line laser beam, utilization efficiency and stability can be improved and noises can be decreased. Further, a manufacturing margin of a laser module can be expanded.

Then, also in this case, since the polarization direction is located in the direction approximately perpendicular to the longitudinal direction of the line beam of fundamental wave, the angle polarization direction from the Brewster face is located in the direction extending along the sheet of drawing in FIG. 8A (direction perpendicular to the sheet of drawing in FIG. 8B), that is, the direction extending along the incident plane in the reflection unit 9 of the light path of the resonator. There is then an advantage that respective optical parts can be located and easily configured.

It should be noted that, while the example shown in FIGS. 8A and 8B shows an example in which the laser medium may be pumped directly, a reflection thin-film coating to confine pumping light within the laser medium may be provided on the surface of the laser medium or at the outside of the laser medium or pumping light may be converged or collimated within the laser medium by a suitable microlens.

When it may be difficult to exhaust heat from the pumping light source and the laser medium by a suitable device such as the Peltier device within the plane parallel to the plane on which the resonator light source is formed in the above-mentioned respective first, second, third, fourth and fifth embodiments, it is desirable that the L-shape supporting body formed of copper and aluminum from which heat can easily be exhausted be used similar to the third embodiment shown in FIGS. 5A to 5C, for example. Embodiments of the present invention using the L-shape supporting body will be described with reference to FIGS. 9A, 9B to FIGS. 12A, 12B.

Sixth Embodiment

Figure 9A:
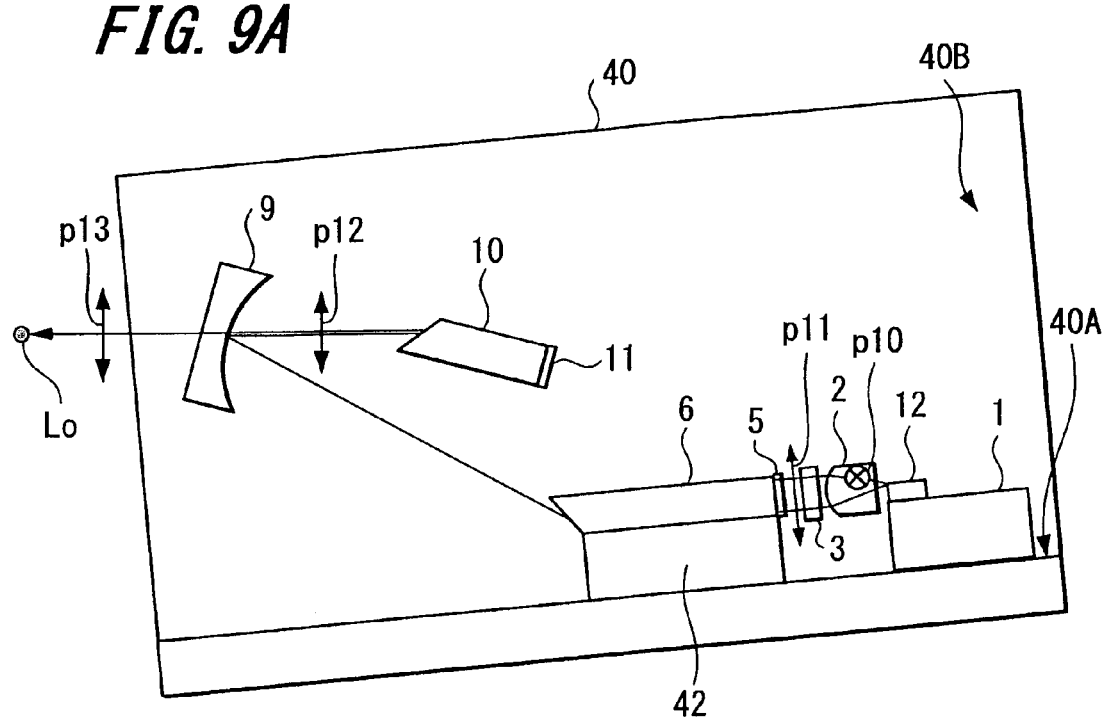
FIGS. 9A and 9B are respectively schematic plan views of a laser light source apparatus according to a sixth embodiment of the present invention.
Figure 9B:
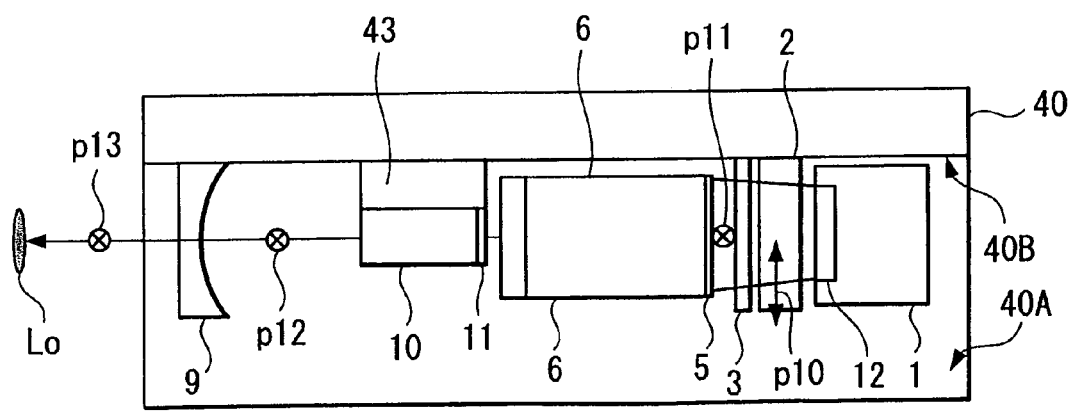

FIGS. 9A and 9B show schematic plan views of a laser light source apparatus using an L-shape supporting body 40 in the above-mentioned arrangement of the fourth embodiment. In FIGS. 9A and 9B, elements and parts identical to those of FIGS. 7A and 7b are denoted by identical reference numerals and therefore need not be described repeatedly.

This embodiment of the present invention shows an example in which the pumping light source 1 and the laser medium 6 are fixedly located on the first face 40A of the L-shape supporting body 40 and in which other optical devices, for example, the collimator lenses 2 and 3, the wave plate 13, the reflection unit 9 and the wavelength conversion element 10 are fixedly located on the second face 40B. In order to adjust the optical axis position, it is desirable that a proper position adjusting member be used. This embodiment of the present invention shows an example in which the laser medium 6 is located on the first face 40A through a position adjusting member 42 as shown in FIG. 9A and in which the wavelength conversion element 10 is located on the second face 40B through a position adjusting member 43.

Seventh Embodiment

Figure 10A:
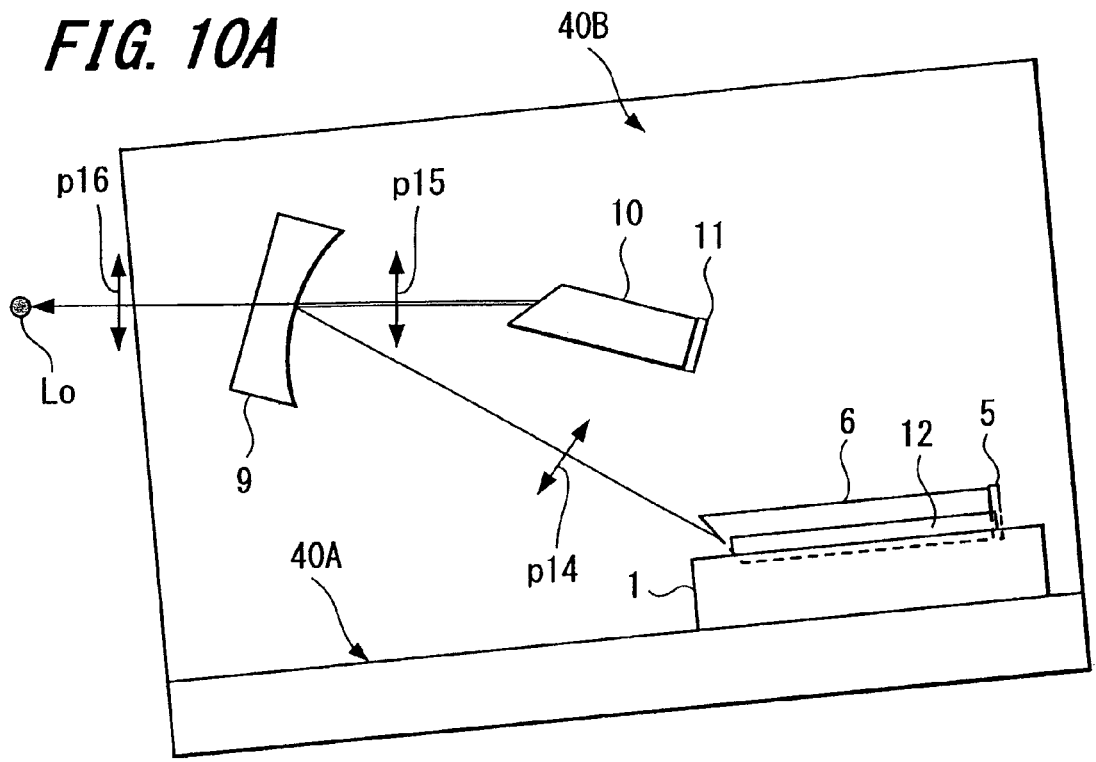
FIGS. 10A and 10B are respectively schematic plan views of a laser light source apparatus according to a seventh embodiment of the present invention.
Figure 10B:
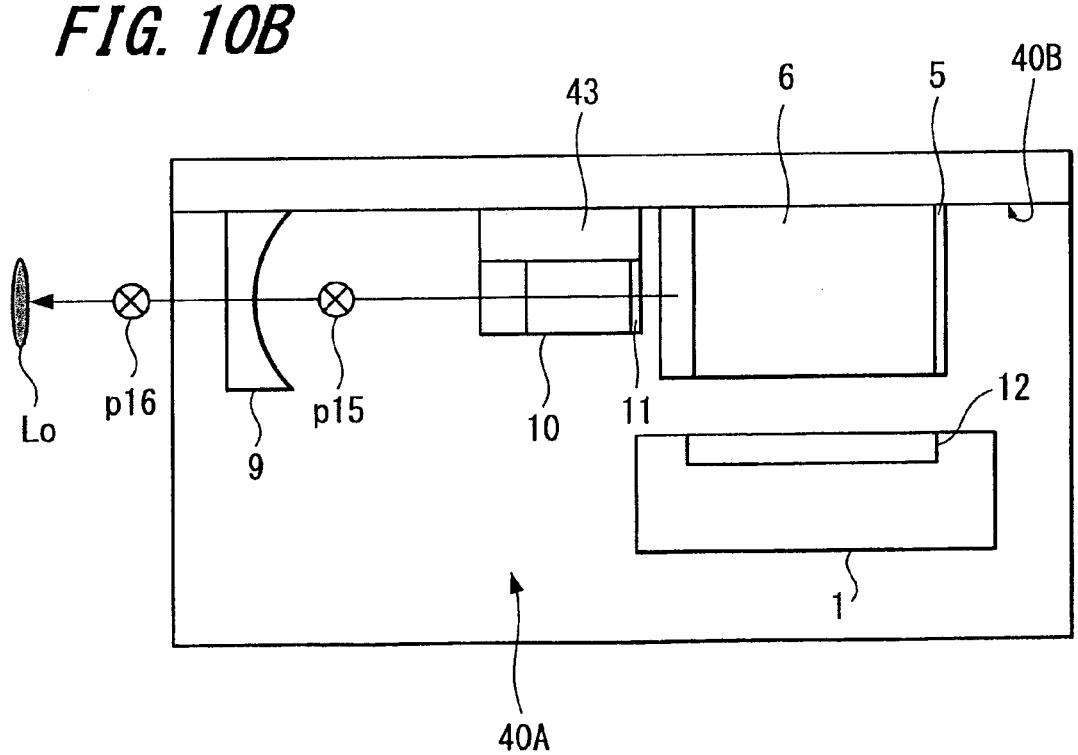

FIGS. 10A and 10B show schematic plan views of a laser light source apparatus using the L-shape supporting body 40 in the above-mentioned arrangement of the fifth embodiment of the present invention. In FIGS. 10A and 10B, elements and parts identical to those of FIGS. 8A and 8B are denoted by identical reference numerals and therefore need not be described repeatedly.

This embodiment of the present invention shows an example in which the pumping light source 1 is fixedly located on the first face 40A of the L-shape supporting body 40 and in which the laser medium 6, the reflection unit 9 and the wavelength conversion element 10 are fixedly located on the second face 40B. Also in this case, this embodiment of the present invention shows an example in which the wavelength conversion element 10 is located on the second face 40B through the position adjusting member 43 in order to adjust the optical axis position.

Eighth Embodiment

Figure 11A:
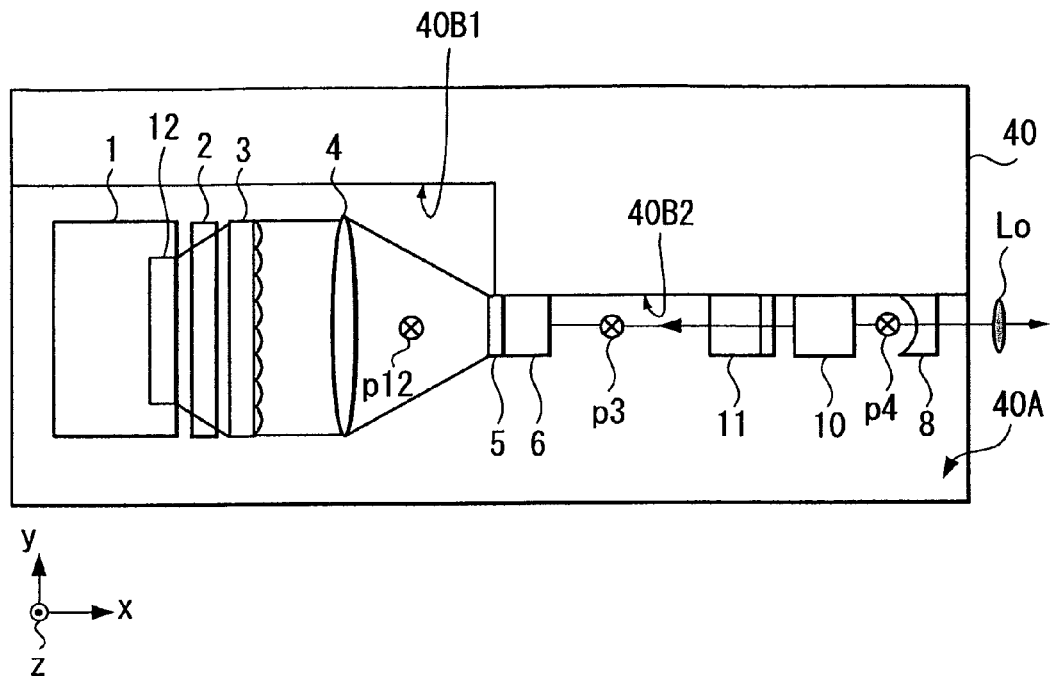
FIGS. 11A and 11B are respectively schematic plan views of a laser light source apparatus according to an eighth embodiment of the present invention.
Figure 11B:
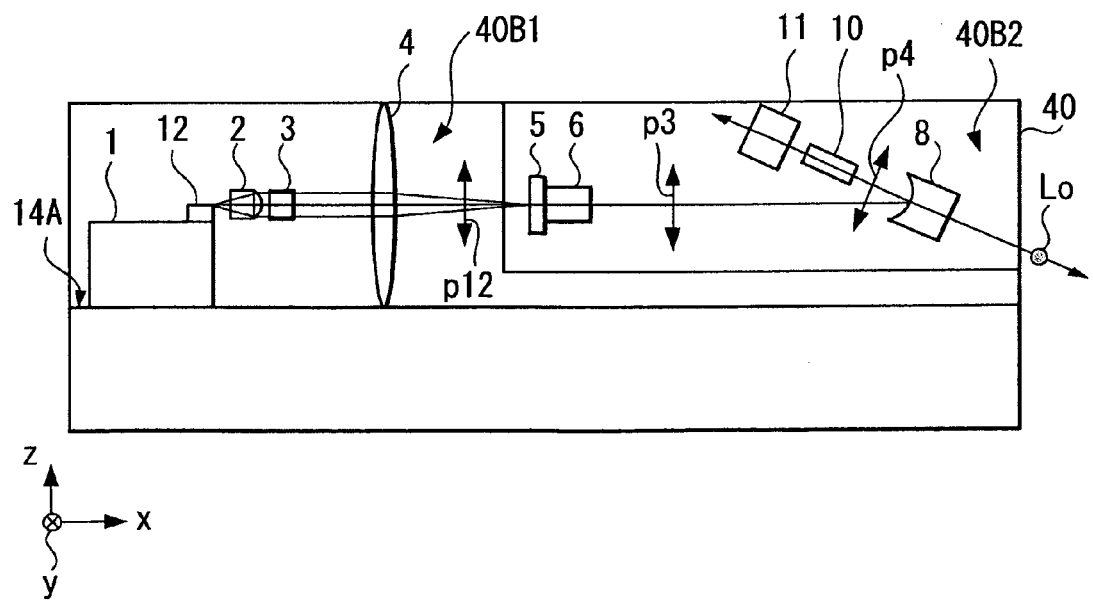

FIGS. 11A and 11B show schematic plan views of a laser light source apparatus using the L-shape supporting body 40 in the above-mentioned arrangement of the second embodiment of the present invention. In FIG. 11B, elements and parts identical to those of FIGS. 4A and 4B are denoted by identical reference numerals and therefore need not be described repeatedly.

This embodiment of the present invention shows an example in which the first face 40A of the L-shape supporting body 40 is formed as a shape having a plane and the second face approximately perpendicular to the first face 40A is formed as a shape including second faces 40B1 and 40B2 of which heights are different in the Y-axis direction. The pumping light source 1 and the lens 4 are fixedly located on the first face 40A and the laser medium 6, the reflection unit 8, the wavelength conversion element 10 and the resonator mirror 11 are fixedly located on the second face 40B2. Although not shown, the collimator lenses 2 and 3 may be fixedly located on the first face 40A through a proper position adjusting member or they may be fixedly located on the second face 40B1. That is, in this case, the second face 40B2 is provided as the plane to locate thereon the laser medium 6, the reflection unit 8 and the like. The second face 40B1 which is parallel to the second face 40B2 is concaved in the Y-axis direction so as not to obstruct laser beam bundles in the light path extended from the pumping light source 1 to the laser medium 6. It should be noted that the laser medium 6, the reflection unit 8, the wavelength conversion element 10 and the resonator mirror 11 may be located by using a suitable position adjusting member instead of the second faces 40B1 and 40B2.

Ninth Embodiment

Figure 12A:
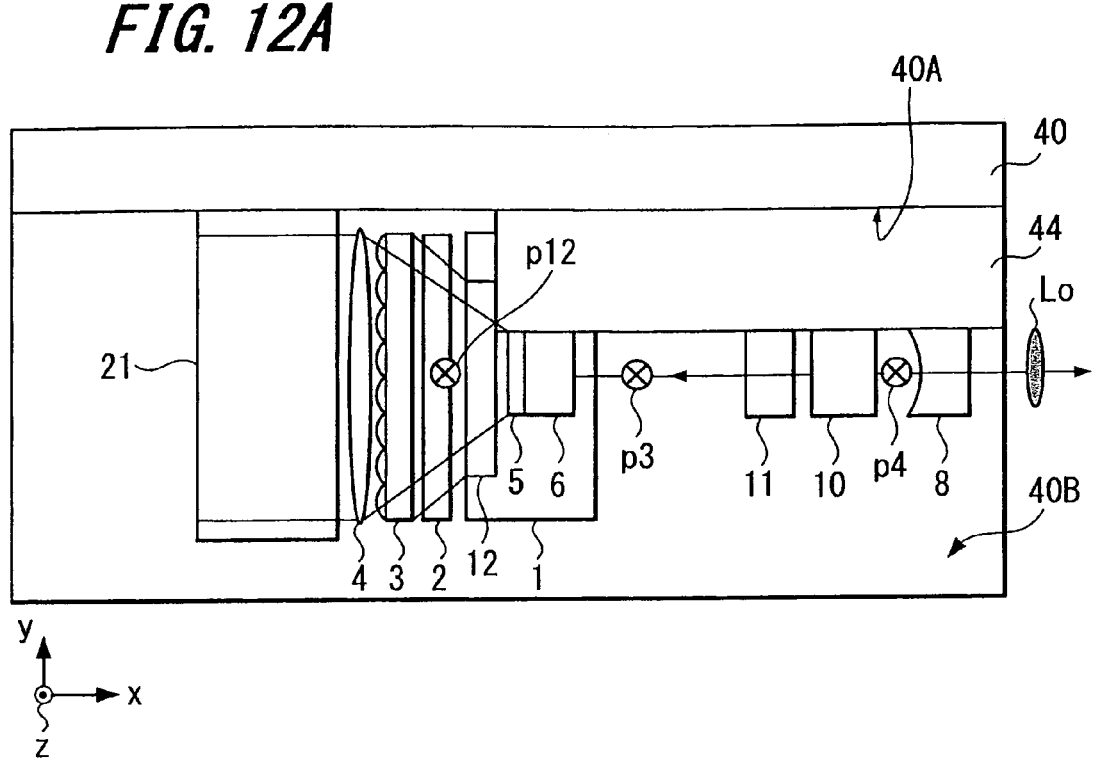
FIGS. 12A and 12B are respectively schematic plan views of a laser light source apparatus according to a ninth embodiment of the present invention.
Figure 12B:
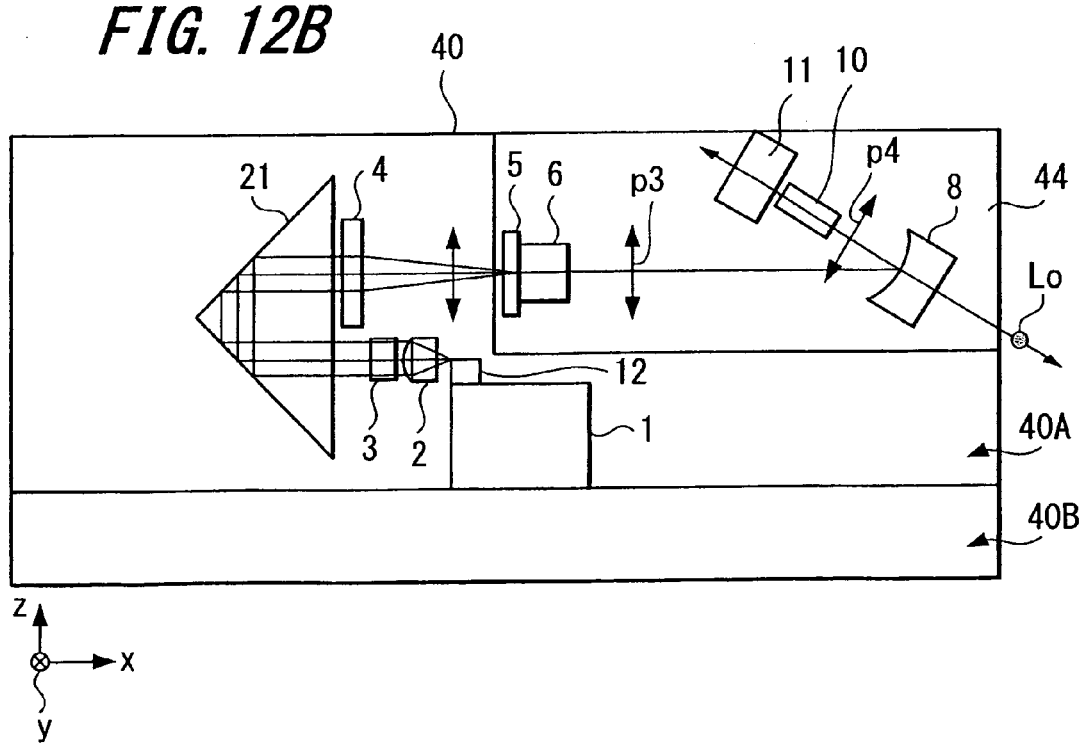

FIGS. 12A and 12B show schematic plan views of a laser light source apparatus of the case in which a prism 21 serving as an optical member to deflect a light path is provided between the pumping light source 1 and the condenser lens 4 in the eighth embodiment shown in FIGS. 11A and 11B. In FIGS. 12A and 12B, elements and parts identical to those of FIGS. 11A and 11B are denoted by identical reference numerals and therefore may not be described repeatedly. In this embodiment of the present invention, as the prism 21, there can be used a prism of which cross-section is approximately rectangular in a plane (X-Y plane) formed by the longitudinal direction of the beam (Y-axis direction) of the line beam of fundamental wave and the converted wave and the direction (X-axis direction) extending along the optical axis of the light path that passes the laser medium 6 and of which cross-section is a triangular prism of approximately isosceles triangle in a plane formed by the Y-axis direction and the beam minor-axis direction (Z-axis direction). Light incident on the prism 21 from the collimator lens 3 is bent twice and reflected in light path in the direction approximately perpendicular to each other by an inclined plane constructing a approximately triangular cross-section of the prism 21 as shown in FIG. 12B and incident on the condenser lens 4. That is, in this case, when light emitted from the pumping light source 1 is incident on the prism 21 through the collimator lenses 2 and 3, the light path thereof is converted approximately 180 degrees and this light is incident on the laser medium 6 through the condenser lens 4.

Then, in this embodiment of the present invention, the prism 21 is fixedly located on the first face 40A or the second face 40B of the L-shape supporting body 40. In this example, the laser medium 6, the reflection unit 8, the wavelength conversion element 10 and the resonator mirror 11 are fixedly located on the position adjusting member 44 fixed to the second face 40B. Also in this case, the collimator lenses 2 and 3 may be fixedly located on the first face 40A or the second face 40B through a suitable position adjusting member. It should be noted that the order and arrangement in which the collimator lenses, the prism, the condenser lens and the like are located are not limited to those of this embodiment and that they may be located in accordance with a manner of suitable excitation.

In the above-mentioned sixth to ninth embodiments of the present invention, respective optical parts configuring the pumping light source and the light path of the resonator are located by using the L-shape supporting body 40 and the position adjusting member if necessary. The L-shape supporting body is used as described above, where the laser light source apparatus according to an embodiment of the present invention can be located on the supporting body with ease. The heat exhausting unit formed of the Peltier device and the like may optionally be located on the rear and the like of the first and/or second faces 40A and 40B and the optical parts such as the pumping light source and the laser medium from which heat may be exhausted are configured to be close to the heat exhausting unit through the supporting body 40 formed of a material such as copper and aluminum with high thermal conductivity, where heat can be easily exhausted from the pumping light source and the laser medium. In particular, the heat exhausting unit may be preferably provided at the rear of the surface close to the pumping light source and the laser medium with much generated heat of the planes of the supporting body 40 in order to decrease heat exhaustion resistance.

In the laser light source apparatus according to an embodiment of the present invention, while a radius of curvature and a mirror surface effective radius (effective range in which a concave mirror can be used as a resonator mirror) of a concave mirror that can be used as a reflection unit are selected by resonator design based on uses, the following combinations, for example, are given as examples. By way of example, a concave mirror having a radius of curvature of 100 mm has an angle of incident of 5 degrees relative to an effective radius of 4 mm (ratio: 25), a concave mirror having a radius of curvature of 100 mm has an angle of incident of 20 degrees relative to an effective radius of 3 mm (ratio: 33), a concave mirror having a radius of curvature of 50 mm has an angle of incident of 10 degree relative to an effective radius of 3 mm (ratio: 16), a concave mirror having a radius of curvature of 20 mm has an incident angle of 5 degrees relative to an effective radius of 1 mm (ratio: 13) and the like. In the case of these combinations, according to the related-art arrangement in which the longitudinal direction of the linear fundamental beam is set within the incident plane of the concave mirror, an amount of wavefront aberration caused by comatic aberration may be larger than about the wavelength. Since comatic aberration may be selected to be approximately ¼ or less of the wavelength due to diffraction limited, in such a case, in particular, if the laser light source apparatus is configured according to an embodiment of the present invention, that is, the longitudinal direction of the line beam of fundamental wave is approximately perpendicular to the incident plane of the reflection light path of the light path of the resonator with large effects being achieved.

Further, while an angle of incident of light incident on the reflection unit of the concave mirror and the like is determined in consideration of the sizes of respective optical parts and a beam diameter of a light path of a resonator and the like, in the case of the arrangement of the embodiment, the longitudinal direction of the line beam of fundamental wave is approximately perpendicular to the incident plane on the reflection unit of the concave mirror and the like. Thus, as compared with the related-art arrangement in which the longitudinal direction of the line beam of fundamental wave lies within the incident plane, the angle of incident can be decreased sufficiently while the effective diameter of the concave mirror and the number of the modes of the multi-transversal mode are being maintained. Not only in the concave mirror but also in the plane mirror such as the resonator mirror 5 in the light path of the resonator on the side of the laser medium shown in FIGS. 3A and 3B, it may be possible to avoid the effective diameter necessary for the mirrors from being increased when the longitudinal direction of the beam becomes an oblique incident direction. Reduction of the effective diameter and decrease of the angle of incident can contribute to reduction of costs of the apparatus, miniaturization of the apparatus and to highly-reliable apparatus. Also, since a distance between the mirrors configuring the light path of the resonator containing the wavelength conversion element is decreased, the mode size in the wavelength conversion element can be decreased and the power density of the line beam of fundamental wave within the resonator can be increased, thereby making it possible to increase efficiency.

In the laser light source apparatus according to an embodiment of the present invention, while the longitudinal direction of the line beam of fundamental wave is approximately 90 degrees relative to the incident plane in the reflection unit, when the above-mentioned wavefront aberration amount is taken into consideration, a range in which this angle can be allowed was examined. Examined results will be described below. The following example shows a case in which the line beam of fundamental wave has a beam shape of a multi-transversal mode pattern, its cross-section is approximately elliptic and in which its major-axis direction becomes a longitudinal direction.

Figure 13:
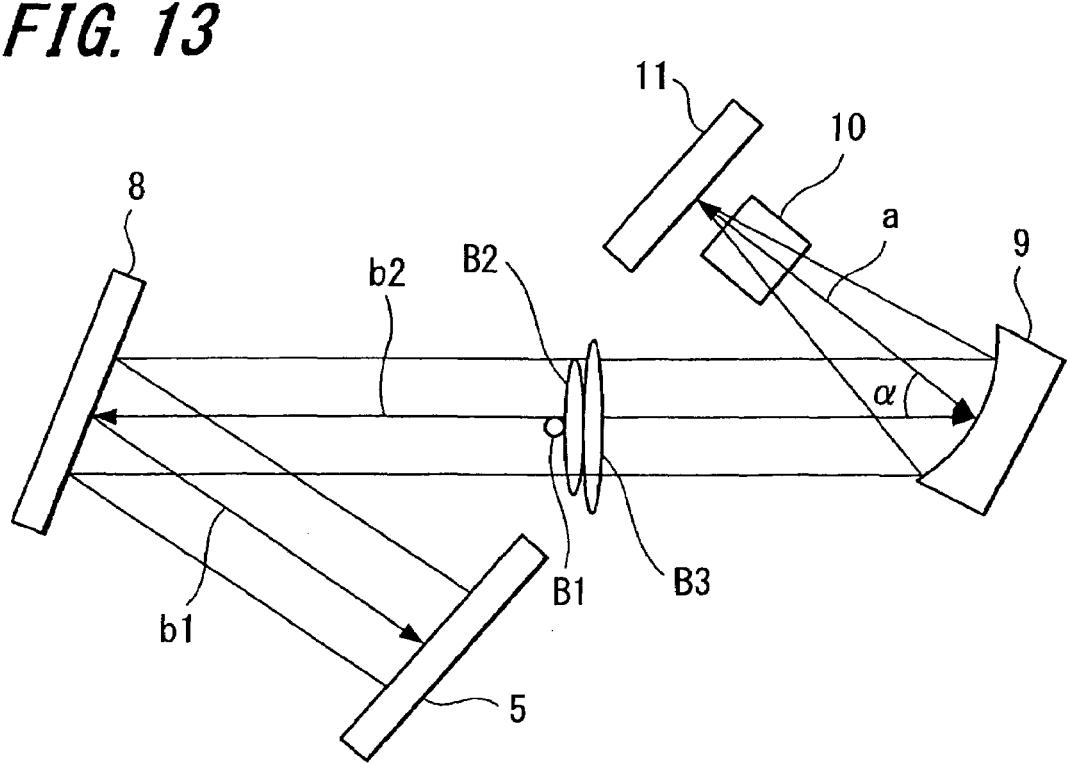
FIG. 13 is a schematic plan view of a main portion of a laser light source apparatus according to the embodiment of the present invention.

FIG. 13 shows a schematic plan view of an example of a laser light source apparatus according to an embodiment of the present invention. In FIG. 13, b1 represents an optical path length from the resonator mirror 5 to the reflection unit 8 and b2 represents an optical path length from the reflection unit 8 to the reflection unit 9 formed of the concave mirror and the like. Here, an optical path length b is expressed as b=b1+b2. An optical path length from the reflection unit 9 formed of the concave mirror to the resonator mirror 11 is represented by a. Although not shown, a laser medium is located between the resonator mirror 5 and the reflection unit 8, a fundamental wave is collimated in the light path between the resonator mirror 5 and the reflection unit 9 and the mode diameter is approximately constant. In order to carry out wavelength conversion at high efficiency, it is desirable that the mode diameter near the wavelength conversion element 10 be made small and therefore a relationship of about 2a<b is satisfied.

When the reflection unit 9 is the concave mirror having the radius of curvature R, since R to a is satisfied, the optical path length b is expressed as:

$$b > 2R \quad (1)$$

On the other hand, the minor-axis side of the line beam of fundamental wave is placed in the multi-transversal single mode (about Gaussian beam). As a stable oscillation condition, a mode radius in which the optical path length b is less than a Rayleigh length (length of which beam diameter becomes $\sqrt{2}$ times the waist diameter) becomes a standard. When $\omega$ represents a beam waist radius of a minor-axis direction (that is, single mode direction if the minor-axis side is set to a multi-transversal mode), $\lambda$ represents a wavelength and n represents a Gaussian beam, Rayleigh length Lr is given by an equation expressed as:

$$Lr = 2 \times \pi \times \omega^2 / \lambda$$

Accordingly, the beam waist diameter $\omega$ should satisfy a condition expressed as:

$$\omega \geq \sqrt{\{\lambda \times b / (2\pi)\}} \quad (2)$$

For example, when $\lambda = 1.064$ μm is satisfied, $\omega = 0.5$ mm → Lr = 1480 mm
$\omega = 0.2$ mm → Lr = 236 mm
$\omega = 0.1$ mm → Lr = 59 mm
$\omega = 0.05$ mm → Lr = 15 mm Further, the upper limit of the beam waist radius $\omega$ may be selected such that the comatic aberration amount may not increase and exceed a wavefront aberration $\lambda/4$ which is a standard of diffraction limited.

Figure 14:
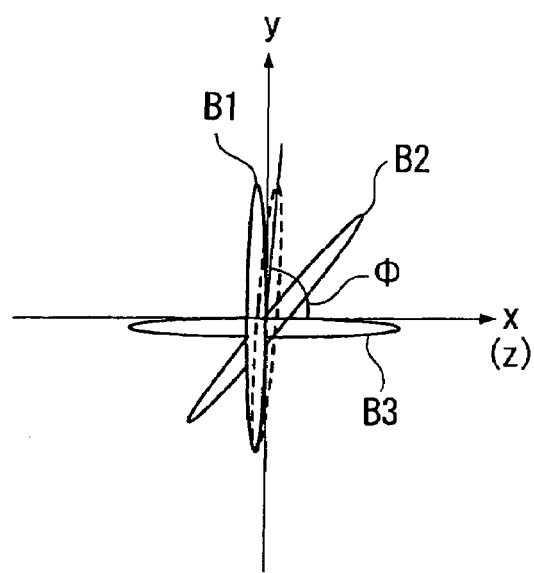
FIG. 14 is a diagram to which reference will be made in explaining an angle of a fundamental wave relative to a incident plane.

Here, as shown in FIG. 14, the longitudinal direction of the line beam of fundamental wave is expected to have an angle $\Phi$ from the x direction extending along the incident plane of the reflection unit to the y direction perpendicular to the incident plane as shown by a broken line. Solid lines B1, B2 and B3 in FIGS. 13 and 14 show beam shapes obtained when $\Phi = 90°$, $45°$ and $0°$ are satisfied, respectively. Also, as shown in FIG. 13, $\alpha$ assumes an angle formed by a light path of a resonator reflected by the reflection unit 9. The smaller angle $\alpha$ of the resonator light path is advantageous for miniaturizing the whole of the laser light source apparatus.

When the angle $\alpha$ of the light path of the resonator is $10°$ and $30°$, optical path lengths b obtained when the curvature R of the concave mirror configuring the reflection unit 9 is selected to be 100 mm, 75 mm and 25 mm, lower limit (this is assumed to be condition 1) of beam radius of a minor-axis direction (single mode direction in the case of the multi-transversal mode) of a fundamental wave between the resonator mirror 5 and the reflection unit 9 so as to provide a resonator configuration that can achieve highly-efficient wavelength conversion, an upper limit (condition 2) of a projection component to the incident plane in the radius beam reflection unit 9 between the resonator mirror 5 and the reflection unit 9 of which comatic aberration may not exceed $\lambda/4$ and the upper limits of aspects (ratio between lengths of the line beam of fundamental wave beam major-axis direction and minor-axis direction) which satisfy the above-described conditions 1 and 2 when the angle $\Phi$ from the incident plane of the longitudinal direction of the line beam of fundamental wave were analyzed. Analyzed results are shown on the following table 1.

TABLE 1

Wavelength λ = 1064 nm

| Resonator light path angle α | Concave mirror curvature R Unit: mm | Optical path length b(>2 to 2R) unit: mm | [condition 1] Lower limit of beam radius ω ≧ √(λb/(2π)) unit: mm | Resonator light path angle α | Upper limit of aspect of fundamental wave that satisfies [conditions 1, 2] | | | |
|---|---|---|---|---|---|---|---|---|
| | | | | | | Φ = 0° | Φ = 45° | Φ = 90° |
| 10° | 100 | 200 | 0.18 | 2.8 | | | | |
| | 75 | 150 | 0.16 | 2.3 | | 15.2 | 30.4 | Infinity |
| | 50 | 100 | 0.13 | 1.8 | | 14.4 | 28.9 | Infinity |
| | 25 | 50 | 0.09 | 1.1 | | 13.8 | 27.7 | Infinity |
| 30° | 100 | 200 | 0.18 | 2.3 | | 12.0 | 23.9 | Infinity |
| | 75 | 150 | 0.16 | 1.8 | | 12.5 | 25.0 | Infinity |
| | 50 | 100 | 0.13 | 1.4 | | 11.3 | 22.6 | Infinity |
| | 25 | 50 | 0.09 | 0.9 | | 10.8 | 21.5 | Infinity |
| | 100 | 200 | 0.18 | 2.8 | | 9.8 | 19.6 | Infinity |

From the results on the above-described table 1, when the laser light source apparatus is configured according to an embodiment of the present invention, that is, the angle Φ from the incident plane of the longitudinal direction of the line beam of fundamental wave is selected to be 90°, the upper limit of the aspect that can satisfy the conditions 1 and 2 become infinite so that the ratio between the major axis and the minor axis can be increased sufficiently.

Next, an angular extent in which comatic aberration can be decreased to be ¼ or less of the wavelength when the angle Φ is shifted from 90° is examined. The angular extent in which the comatic aberration can be suppressed to be less than a certain one is changed depending on the angle α of the light path of the resonator, the curvature R of the concave mirror used as the reflection unit 9 shown in FIG. 13, the lower limit of the minor-axis side radius of the line beam of fundamental wave, the ratio (aspect) between the major axis and the minor axis of the line beam of fundamental wave, the wavelength λ of the line beam of fundamental wave and the like. In the following example, the wavelength of the line beam of fundamental wave was selected to be 1064 nm.

First, the following tables 2 to 4 show results obtained when comatic aberration was analyzed in the state in which the angle α of the light path of the resonator was selected to be 30°, the radius of curvature R of the concave mirror serving as the reflection unit was selected to be 15 mm, 50 mm and 75 mm, the aspect of the line beam of fundamental wave was changed to 10, 20, 30 and 50 and the angle Φ was changed from 90° to 80°, 70°, 45°, and 0°. It should be noted that, from the equations (1) and (2), when the radius of curvature R of the concave mirror is 15 mm, a standard of a lower limit of radius of the multi-transversal single mode side (beam minor-axis side) was selected to be 0.07 mm, when the radius of curvature R is 50 mm, a standard of a lower limit of a radius of the multi-transversal single mode side was selected to be 0.13 mm and when the radius of curvature R is 75 mm, a standard of a lower limit of a radius of the multi-transversal single mode side was selected to be 0.16 mm. Comatic aberration was described in the unit of a wavelength λ. That is, comatic aberration becomes good when the wavelength is less than 0.25 and it becomes bad when the wavelength is greater than 0.25. The following tables show projection components in the plane direction formed by the light path of the resonator of the mode diameter. It should be noted that an example in which Φ=0° is satisfied shows a related-art arrangement.

TABLE 2

RESONATOR LIGHT PATH ANGLE α = 30°,
CONCAVE MIRROR CURVATURE R = 15 mm AND
STANDARD OF LOWER LIMIT OF RADIUS OF MULTI-TRANSVERSAL
SINGLE MODE SIDE = 0.07 mm

| Beam aspect | | Projection component of plane direction formed by resonator light path of mode diameter | | | | | Asymmetric component amount (unit: λ) of wavefront aberration (good if <0.25 and bad if ≧0.25) | | | | |
|---|---|---|---|---|---|---|---|---|---|---|---|
| | | Angle Φ | | | | | | | | | |
| | | 90° | 80° | 70° | 45° | 0° | 90° | 80° | 70° | 45° | 0° |
| | Cos Φ | 0.00 | 0.17 | 0.34 | 0.71 | 1.00 | | | | | |
| 50 | | 0.07 | 0.61 | 1.20 | 2.47 | 3.50 | <0.001 | 0.2 | 1.5 | 12 | 35 |
| 30 | | 0.07 | 0.36 | 0.72 | 1.48 | 2.10 | <0.001 | 0.04 | 0.6 | 2.5 | 7 |
| 20 | | 0.07 | 0.24 | 0.48 | 0.99 | 1.40 | <0.001 | 0.01 | 0.1 | 0.8 | 2 |
| 10 | | 0.07 | 0.12 | 0.24 | 0.49 | 0.70 | <0.001 | <0.01 | <0.01 | 0.1 | 0.3 |

TABLE 3

RESONATOR LIGHT PATH ANGLE α = 30°,
CONCAVE MIRROR CURVATURE R = 50 mm AND
STANDARD OF LOWER LIMIT OF RADIUS OF MULTI-TRANSVERSAL
SINGLE MODE SIDE = 0.13 mm

| Beam aspect | | Projection component of plane direction formed by resonator light path of mode diameter | | | | | Asymmetric component amount (unit: λ) of wavefront aberration (good if <0.25 and bad if ≧0.25 | | | | |
|---|---|---|---|---|---|---|---|---|---|---|---|
| | | Angle Φ | | | | | | | | | |
| | | 90° | 80° | 70° | 45° | 0° | 90° | 80° | 70° | 45° | 0° |
| | Cos Φ | 0.00 | 0.17 | 0.34 | 0.71 | 1.00 | | | | | |
| 50 | | 0.13 | 1.13 | 2.22 | 4.60 | 6.50 | <0.001 | 0.1 | 0.8 | 7 | 20 |
| 30 | | 0.13 | 0.68 | 1.33 | 2.76 | 3.90 | <0.001 | 0.02 | 0.15 | 1.5 | 4 |
| 20 | | 0.13 | 0.45 | 0.89 | 1.84 | 2.60 | <0.001 | <0.01 | 0.05 | 0.4 | 1.2 |
| 10 | | 0.13 | 0.23 | 0.44 | 0.92 | 1.30 | <0.001 | <0.01 | <0.01 | 0.05 | 0.15 |

TABLE 4

RESONATOR LIGHT PATH ANGLE α = 30°,
CONCAVE MIRROR CURVATURE R = 75 mm AND
STANDARD OF LOWER LIMIT OF RADIUS OF MULTI-TRANSVERSAL
SINGLE MODE SIDE = 0.16 mm

| Beam aspect | | Projection component of plane direction formed by resonator light path of mode diameter | | | | | Asymmetric component amount (unit: λ) of wavefront aberration (good if <0.25 and bad if ≧0.25 | | | | |
|---|---|---|---|---|---|---|---|---|---|---|---|
| | | Angle Φ | | | | | | | | | |
| | | 90° | 80° | 70° | 45° | 0° | 90° | 80° | 70° | 45° | 0° |
| | Cos Φ | 0.00 | 0.17 | 0.34 | 0.71 | 1.00 | | | | | |
| 50 | | 0.16 | 1.39 | 2.74 | 5.66 | 8.00 | <0.001 | 0.08 | 0.7 | 6 | 20 |
| 30 | | 0.16 | 0.83 | 1.64 | 3.39 | 4.80 | <0.001 | 0.02 | 0.15 | 1.5 | 3.5 |
| 20 | | 0.16 | 0.56 | 1.09 | 2.26 | 3.20 | <0.001 | <0.01 | 0.04 | 0.4 | 1 |
| 10 | | 0.16 | 0.28 | 0.55 | 1.13 | 1.60 | <0.001 | <0.001 | <0.01 | <0.05 | 0.15 |

From the results shown on the above-described table 2, when the radius of curvature R of the concave mirror is selected to be R=15 mm, the multi-transversal single mode side radius lower limit standard is selected to be 0.07 mm, if the beam aspect ratio is less than 20, comatic aberration can be decreased to ¼ or less of the wavelength up to the angle Φ=70°, that is, Φ=90°±20° and that, if the beam aspect ratio lies in a range of from 20 to 50, comatic aberration can be decreased to ¼ or less of the wavelength up to the angle Φ=80°, that is, Φ=90°±10°.

Moreover, from the results on the above-described tables 3 and 4, it is to be understood that, when the radius of curvature R of the concave mirror is selected to be R=50 mm, the multi-transversal single mode side radius lower limit standard is selected to be 0.13 mm, when the radius of curvature R of the concave mirror is R=75 mm and when the multi-transversal single mode side radius lower limit standard is selected to be 0.16 mm if the beam aspect ratio is less than 30, comatic aberration can be decreased to ¼ or less of the wavelength up to the angle Φ=70°=90°±20° and that, if the beam aspect ratio lies in a range of from 30 to 50, comatic aberration can be decreased to ¼ or less of the wavelength up to the angle Φ=80°=90°±10°.

Next, comatic aberration was analyzed when the wavelength of the line beam of fundamental wave was selected to be 1064 nm, the resonance light path angle was selected to be α=10°, the radius of curvature R of the concave mirror was selected to be R=75 mm and the multi-transversal single mode side radius lower limit standard was selected to be 0.16 mm in the state in which the aspect and the angle α were changed similarly. Analyzed results are shown on the following table 5.

TABLE 5

RESONATOR LIGHT PATH ANGLE α = 10°,
CONCAVE MIRROR CURVATURE R = 75 mm AND
STANDARD OF LOWER LIMIT OF RADIUS OF MULTI-TRANSVERSAL
SINGLE MODE SIDE = 0.16 mm

| Beam aspect | | Projection component of plane direction formed by resonator light path of mode diameter | | | | | Asymmetric component amount (unit: λ) of wavefront aberration (good if <0.25 and bad if ≧0.25 | | | | |
|---|---|---|---|---|---|---|---|---|---|---|---|
| | | Angle Φ | | | | | | | | | |
| | | 90° | 80° | 70° | 45° | 0° | 90° | 80° | 70° | 45° | 0° |
| | Cos Φ | 0.00 | 0.17 | 0.34 | 0.71 | 1.00 | | | | | |
| 50 | | 0.16 | 1.39 | 2.74 | 5.66 | 8.00 | <0.001 | 0.04 | 0.3 | 3 | 8 |

TABLE 5-continued

RESONATOR LIGHT PATH ANGLE α = 10°,
CONCAVE MIRROR CURVATURE R = 75 mm AND
STANDARD OF LOWER LIMIT OF RADIUS OF MULTI-TRANSVERSAL
SINGLE MODE SIDE = 0.16 mm

| Beam aspect | Projection component of plane direction formed by resonator light path of mode diameter Angle Φ | | | | | Asymmetric component amount (unit: λ) of wavefront aberration (good if <0.25 and bad if ≧0.25 | | | | |
|---|---|---|---|---|---|---|---|---|---|---|
| | 90° | 80° | 70° | 45° | 0° | 90° | 80° | 70° | 45° | 0° |
| 30 | 0.16 | 0.83 | 1.64 | 3.39 | 4.80 | <0.001 | 0.01 | 0.075 | 0.6 | 1.5 |
| 20 | 0.16 | 0.56 | 1.09 | 2.26 | 3.20 | <0.001 | <0.01 | 0.01 | 0.2 | 0.5 |
| 10 | 0.16 | 0.28 | 0.55 | 1.13 | 1.60 | <0.001 | <0.001 | <0.01 | 0.02 | 0.06 |

The table 4 shows that, if the beam aspect ratio is less than 30, then comatic aberration can be decreased to ¼ or less of the wavelength up to the angle Φ=70°=90°±20° and that, if the beam aspect ratio lies in range of from 30 to 50, then comatic aberration can be decreased to ¼ or less of the wavelength up to angle Φ=80°=90°±10°.

From the above-described results, it is clear that, when the multi-transversal mode beam is used as the line beam of fundamental wave, the reflection angle of the light path of the resonator is selected to be less than 30°, the curvature of the concave mirror available as the reflection unit is selected to be 15 mm and the aspect (ratio of major axis and minor axis) of the line beam of fundamental wave is selected to be less than 20, the angle of the major-axis direction (that is, longitudinal direction) of the line beam of fundamental wave relative to the incident plane of the reflected light path can be selected in a range of from 90°±20°. Also, as is clear from the tables 2 to 5, it is desirable that, if the aspect ratio is selected so as to fall within a range of from 20 to 50, then the above-mentioned angle be selected in a range of from 90°±10°.

As described above, it can be expected that a acceptable range of the angle Φ formed between the longitudinal direction of the line beam of fundamental wave and the incident plane in the reflection unit located within the laser resonator will fluctuate depending on a variety of conditions selected in the applied optical apparatus, that is, conditions such as wavelengths, shapes (aspects) of converted waves and arrangements of apparatus (reflection angle of light path of resonator and resonator length).

For example, in the laser light source apparatus according to an embodiment of the present invention, it is desirable that the angle of incident α of the line beam of fundamental wave in the reflection unit that reflects the light path within the resonator be used in a range of from about 5 degrees to 45 degrees. When the angle of incident of the line beam of fundamental wave exceeds 30°, it is desirable that the angle Φ of the longitudinal direction of the line beam of fundamental wave relative to the incident plane be selected to be a value closer to 90°. Conversely, when the reflection angle α of the light path of the resonator is set to be under 20° or when the aspect can be set to be small, the permissible range of the angle Φ of the longitudinal direction of the line beam of fundamental wave relative to the incident plane can be set to be wider.

Further, when the concave mirror is used as the reflection unit to reflect the light path of the resonator, it is desirable that a value which results from dividing the radius of curvature of the concave mirror with the effective diameter of this concave mirror should fall within a range of from 3 to 50 in actual practice. According to an embodiment of the present invention, as compared with the related art in which laser light is incident on the laser medium obliquely relative to the longitudinal direction of the beam, the effective diameter of the concave mirror can be decreased without reducing the angle of incident and the curvature of the concave mirror can be decreased without increasing the aberration amount.

Tenth Embodiment

Figure 15:
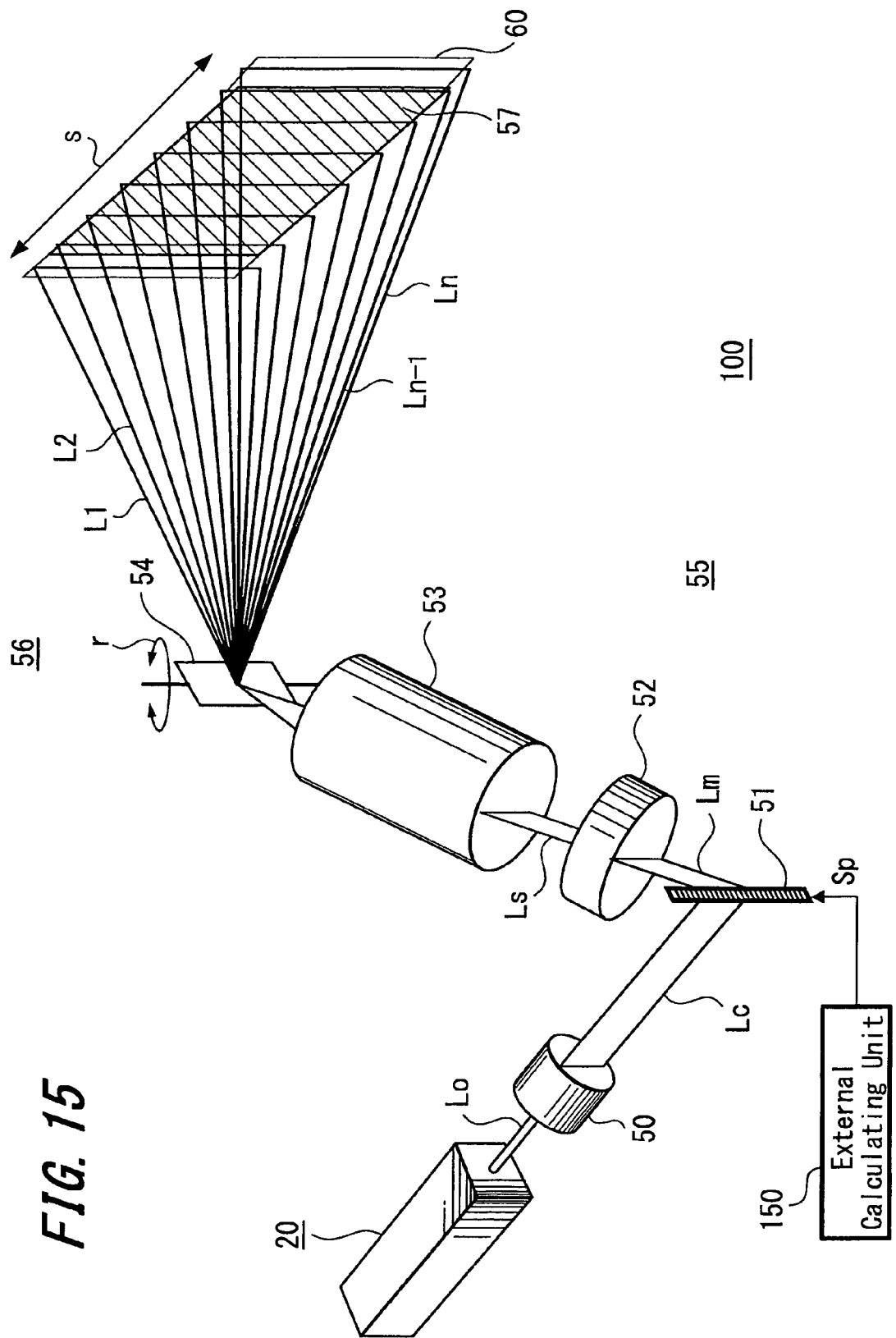
FIG. 15 is a schematic diagram of an image generating apparatus according to the embodiment of the present invention.

Next, an embodiment of an image generating apparatus according to an embodiment of the present invention using the laser light source apparatus having the configuration according to an embodiment of the present invention will be described with reference to FIG. 15. As shown in FIG. 15, this image generating apparatus 100 is composed of the laser light source apparatus 20 having the configuration according to an embodiment of the present invention and an illumination optical system (not shown), for example, a light modulation unit 55 including a diffraction grating type one-dimensional light modulation apparatus 51 and a light selection unit 52 and a scanning optical unit 56 including a projection optical unit 53 and a scanning device 54. The laser light source apparatus 20 can be configured to output one-dimensional converted wave of multi-transversal mode, for example, a second higher harmonic wave similarly to the aforementioned embodiments. Then, laser light Lo emitted from this laser light source apparatus 20, of which laser beam bundle shape is beam-shaped by the illumination optical system (not shown), is irradiated as a laserlight Lc, and the one-dimensional light modulation apparatus 51 of the diffraction grating type configuration, for example, is irradiated with the laserlight Lcas one-dimensional (linear) light beam.

The diffraction grating type one-dimensional light modulation apparatus 51 can be operated in response to a signal from a driving circuit (not shown) based on an image signal generated by an external calculating unit 150. When the one-dimensional light modulation apparatus 51 is configured as the diffraction grating type, diffracted light from the one-dimensional light modulation apparatus 51 is incident on the light selection apparatus 52. It should be noted that, when light of three primary colors, for example, are in use, laser beam bundles from light sources of respective colors are superposed by a color synthesizing unit such as an L-shape prism through a one-dimensional illumination apparatus and light modulation apparatus for respective colors and a superposed laser beam bundle is emitted to the light selection unit although not shown.

The light selection unit 52 is formed of a suitable device such as Offner relay optical system and includes a spatial filter (not shown) such as a Schlieren filter. In the light selection unit 52, +first-order light, for example, is selected and emitted as one-dimensional image light Lm. Further, the one-dimensional image light Lm is enlarged by the projection optical unit 53 and the like and scanned as shown by L1, L2, . . . Ln−1, Ln as the scanning device 54 in the scanning optical unit 56 is rotated as shown by an arrow r, thereby resulting in a two-dimensional image 57 being generated on an image generating surface 60 such as a screen. On the image generating surface 60, the scanning position is scanned as shown by an arrow s. As the scanning device 54, it may be possible to use a so-called resonant scanner oscillated by a suitable device such as an electromagnet to scan the scanning position in addition to a galvano mirror and a polygon mirror.

As the light modulation apparatus, it may be possible to use a one-dimensional light modulation device such as a GLV (Grating Light Valve (Grating Light Valve®): reflection type diffraction grating) type light modulation device developed by Silicon Light Machines Corporation in U.S.A. Linear light of multi-transversal mode, beam-shaped linear light or light from a parallel light source may be irradiated on this GLV (GLV®) device.

In the laser light source apparatus 20, when non-uniformities of intensity distribution of converted wave are relatively large, image quality of images obtained when the laser light source apparatus 20 is applied to the image generating apparatus 100 is degraded by uneven illumination. The above non-uniformities of intensity distribution can be decreased sufficiently using the laser light source apparatus having the configuration according to the embodiment of the present invention and an output from the image generating apparatus 100 can be stabilized so that it may be possible to generate images of excellent image quality with lesser uneven illumination. Alternatively, when non-uniformities of the converted wave are reflected on correction of signal intensity of the light modulation unit, the present invention can provide improvements of light utilization efficiency.

It should be noted that the image generating apparatus according to the embodiment of the present invention is not limited to the above-mentioned example. The light modulation unit, the projection optical unit, the scanning optical unit and the like can be variously modified and changed except that at least one of the laser light source apparatus is configured according to the embodiment of the present invention. Also, a display system of the inventive image generating apparatus is not limited to a projection type display and the image generating apparatus according to the embodiment of the present invention can be applied to various types of laser drawing apparatus capable of generating character information and images by laser drawing, such as a laser printer.

Further, the image generating apparatus according to the embodiment of the present invention is not limited to a case in which the above-mentioned one-dimensional light modulation apparatus used and can be applied to a two-dimensional light modulation apparatus such as a DMD (Digital Micromirror Device) and a resonance type scanning mirror. In addition, it is needless to say that materials and arrangements of illumination optical systems, projection systems, other optical systems, and other system than laser apparatus of light sources can be variously modified and changed without departing from the arrangement of the embodiment.

Furthermore, except the image generating apparatus, the present invention may be applied to at least one laser light source apparatus insofar as the laser light source apparatus is an optical apparatus that includes at least one laser apparatus including a wavelength conversion element within a resonator.

As set forth above, according to the embodiment of the present invention, in the laser light source apparatus capable of outputting a line beam of converted wave by the wavelength conversion element provided within the solid-state laser resonator, the following effects [1] to [5] can be achieved by locating the plane formed by the light path of the resonator, in particular, the incident plane when the concave mirror is used and the longitudinal direction of a line beam of fundamental wave and the line beam of the converted wave obtained in this resonator such that they become approximately perpendicular to each other.

[1] Symmetry of the shape of the longitudinal direction of the line beam of fundamental wave oscillating within the resonator and the converted wave such as higher harmonic wave generated by irradiating the line beam of fundamental wave onto the wavelength conversion element can be improved and uniformity of the longitudinal direction can be increased. When the laser light source apparatus according to an embodiment of the present invention is used as the light source of the optical apparatus such as the image generating apparatus and the optical process apparatus, the present invention can contribute to improvement of uniformity in the longitudinal direction of the line beam output light, improvement of irradiation efficiency, improvement of stability and reduction of noises.

[2] Since the number of spatial modes (number of multi-transversal modes) of the line beam of fundamental wave oscillating within the resonator can be increased, coherence can be decreased and beam intensity can be made uniform. Also, temporal stability of beam can be increased so that efficiency can be increased, stability can be improved and noises can be decreased when the laser light source apparatus according to an embodiment of the present invention is applied to the other optical apparatus.

[3] Since increase of comatic aberration in the concave mirror within the resonator of the longitudinal direction of the line beam of fundamental wave can be suppressed even when the angle between the light paths of the resonators is comparatively large, a distance between the respective optical devices configuring the resonator can be decreased. As a result, the present invention can contribute to miniaturization of the apparatus, highly-efficient apparatus and highly-reliable apparatus, which can decrease a cost of the apparatus.

[4] A distance between the devices configuring the resonator can be easily decreased and the angle between the light paths of the resonators can be decreased without decreasing the number of the spatial modes of the line beam of fundamental wave oscillating within the resonator while a high aspect ratio can be kept by maintaining the beam width of the longitudinal direction of the line beam of fundamental wave. Consequently, the margins (laser module margins) of the arrangements and configurations of the respective optical parts can be enlarged, the apparatus can be reduced in size, the apparatus can be made highly-efficient and the apparatus can be made highly-reliable, which can contribute to decrease of costs.

[5] When the optical axis of the laser beam of the line beam of fundamental wave is adjusted, it is ordinary that accuracy of the adjustment of the minor axis is requested to be high as compared with accuracy of the adjustment of the longitudinal direction of the beam. When the laser light source apparatus is configured according to an embodiment of the present invention, the beam minor-axis direction becomes the plane formed by the light path of the resonator. Accordingly, the optical adjustment mechanism such as the steering angle adjustment mechanism that can move within the plane on which respective optical parts configuring the resonator are disposed, that is, the plane extending along the surface of the supporting body in which these optical parts are located may be provided and it may be possible to simplify an adjustment mechanism with respect to the direction perpendicular to these planes. In particular, when a steering angle mechanism within the plane perpendicular to the surface of the supporting body is provided, a movable unit becomes complex in arrangement. Hence, the movable unit can be simplified, which becomes a large advantage.

It should be noted that, when the reflection unit is formed by the concave mirror or when the end faces of the laser medium, the wavelength conversion element and the like are formed as the concave surfaces, a steering angle can be adjusted by a translating mechanism. Even when the translating mechanism is provided, the movable mechanism within the surface of the supporting body becomes a remarkably simple mechanism as compared with a movable mechanism of the vertical direction. Accordingly, regardless of the fact that the movable unit is composed of assembly parts or it is formed of a manipulator mechanism, if the steering angle mechanism and the translating mechanism are both configured according to an embodiment of the present invention, then the arrangement of the movable unit necessary for optical adjustment can be simplified remarkably, which can contribute to reduction of costs, highly-reliable apparatus and miniaturization of apparatus.

Moreover, when at least one light entrance and exit face of the laser medium and the wavelength conversion element in the resonator is formed as an inclined plane having a Brewster angle relative to fundamental waves, that is, Brewster face, the following effects [6] and [7] can be achieved in addition to the above-described effects [1] to [5] obtained by making the longitudinal direction of the line beam of fundamental wave become perpendicular to the plane formed by the light path of the resonator.

[6] Since the oscillation mode can be limited to polarized light of the wavelength conversion direction by only the Brewster face, the Brewster plate can be removed, parts can be decreased, the apparatus can be reduced in size, and the apparatus can be made highly-efficient and highly-reliable.

[7] Since the Brewster face in the wavelength conversion element can be made high in transmittance with respect to both of the line beam of fundamental wave and the higher harmonic wave, optical loss within the resonator can be suppressed to be low, a power density of the oscillating fundamental wave can be improved and conversion efficiency can be increased.

It should be noted that the present invention is not limited to the arrangements described in the above-mentioned embodiments and that the number of parts, materials, arrangements and the like of optical devices such as the reflection unit within the resonator and laser beam bundle shaping lenses in the laser light source apparatus, for example, may be variously modified and changed without departing from the arrangement of the embodiment. Also, as described above, the higher harmonic wave generated in the wavelength conversion element is not limited to the second higher harmonic wave and higher harmonic waves of higher than the third harmonic wave can be applied, and the present invention can be applied to higher harmonic wave generation based on sum-frequency generation and conversion based on optical parametric oscillation.

It may be understood by those skilled in the art that various modifications, combinations, sub-combinations and alterations may occur depending on design requirements and other factors insofar as they are within the scope of the appended claims or the equivalents thereof.

What is claimed is:

1. A laser light source apparatus comprising:
a pumping light source, and
a pair of resonator mirrors, wherein
the resonator includes at least a laser medium and a wavelength conversion element;
the laser medium is pumped by light having a multi-transversal mode pattern and the wavelength conversion element are irradiated with a line beam of fundamental wave obtained by the oscillation by the laser medium to output a line beam of converted wave; and
at least one reflector bending light path is provided in the resonator such that a longitudinal direction of the line beam of fundamental wave is approximately perpendicular to an incident plane of a reflection unit, wherein the wavelength conversion element and the reflection unit are located at side of a supporting body that is different from a side of the pumping light source.

2. A laser light source apparatus according to claim 1, wherein
the reflection unit includes a concave mirror.

3. A laser light source apparatus according to claim 1, wherein
the pumping light source includes a laser diode.

4. A laser light source apparatus according to claim 1, wherein
the pumping light source includes a laser diode array having a plurality of laser diodes arranged one-dimensionally.

5. A laser light source apparatus according to claim 1, wherein
any one of a longitudinal direction of the beam having a multi-transversal mode pattern emitted from the pumping light source and an incident direction of the beam from the pumping light source into the laser medium is directed at approximately perpendicular to a plane including an oscillation light path of the line beam of fundamental wave oscillating within the resonator.

6. A laser light source apparatus comprising:
a pumping light source, and
a pair of resonator mirrors, wherein
the resonator includes at least a laser medium and a wavelength conversion element;
the laser medium is pumped by light having a multi-transversal mode pattern and the wavelength conversion element are irradiated with a line beam of fundamental wave obtained by the oscillation by the laser medium to output a line beam of converted wave; and
at least one reflector bending light path is provided in the resonator such that a longitudinal direction of the line beam of fundamental wave is approximately perpendicular to an incident plane of the reflection unit; wherein
any one of a longitudinal direction of a beam having a multi-transversal mode pattern emitted from the pumping light source and an incident direction of the beam from the pumping light source into the laser medium is directed at approximately perpendicular to a plane including an oscillation light path of the line beam of fundamental wave oscillating within the resonator; and
further comprising
a supporting body having an approximately L-shape cross-section includes the pumping light source and the resonator on first and second planes thereof which are located approximately perpendicular to each other.

7. A laser light source apparatus comprising:
a pumping light source, and
a pair of resonator mirror, wherein
the resonator includes at least a laser medium and a wavelength conversion element;
the laser medium is pumped by light having a multi-transversal mode pattern and the wavelength conversion element are irradiated with a line beam of fundamental wave obtained by the oscillation by the laser medium to output a line beam of converted wave; and
at least one reflector bending light path is provided in the resonator such that a longitudinal direction of the line beam of fundamental wave is approximately perpendicular to an incident plane of a reflection unit, wherein
a polarization direction of a line beam of fundamental wave oscillating within the resonator is approximately vertical to the longitudinal direction of the line beam of fundamental wave.

8. An image generating apparatus comprising:
a laser light source apparatus,
an optical modulation unit modulating light emitted from the laser light source apparatus in response to information, and
a projection optical unit,
the laser light source apparatus including a pumping light source, and
a pair of resonator mirrors, wherein
the resonator includes at least a laser medium and a wavelength conversion element;
the laser medium is pumped by light having a multi-transversal mode pattern and the wavelength conversion element are irradiated with a line beam of fundamental wave obtained by the oscillation by the laser medium to output line beams of converted waves; and
at least one reflector bending light path is provided in the resonator such that a longitudinal direction of the line beam of fundamental wave is approximately perpendicular to an incident plane of a reflection unit.

\* \* \* \* \*